United States Patent
Bruce et al.

(10) Patent No.: US 10,013,373 B1
(45) Date of Patent: Jul. 3, 2018

(54) MULTI-LEVEL MESSAGE PASSING DESCRIPTOR

(71) Applicant: BiTMICRO Networks, Inc., Fremont, CA (US)

(72) Inventors: Ricardo H. Bruce, Fremont, CA (US); Bernard Sherwin Leung Chiw, Quezon (PH); Margaret Anne Nadonga Somera, Caloocan (PH)

(73) Assignee: BiTMICRO Networks, Inc., Fremont, CA (US)

( * ) Notice: Subject to any disclaimer, the term of this patent is extended or adjusted under 35 U.S.C. 154(b) by 0 days.

(21) Appl. No.: 15/344,537

(22) Filed: Nov. 6, 2016

Related U.S. Application Data

(63) Continuation of application No. 14/217,041, filed on Mar. 17, 2014, now Pat. No. 9,501,436.

(60) Provisional application No. 61/800,395, filed on Mar. 15, 2013.

(51) Int. Cl.
*G06F 13/28* (2006.01)
*G06F 13/16* (2006.01)

(52) U.S. Cl.
CPC .......... *G06F 13/28* (2013.01); *G06F 13/1673* (2013.01)

(58) Field of Classification Search
CPC ....................................................... G06F 13/28
See application file for complete search history.

(56) References Cited

U.S. PATENT DOCUMENTS

| | | | |
|---|---|---|---|
| 4,402,040 A | 8/1983 | Evett | |
| 4,403,283 A | 9/1983 | Myntti et al. | |
| 4,752,871 A | 6/1988 | Sparks | |
| 4,967,344 A | 10/1990 | Scavezze et al. | |
| 5,111,058 A | 5/1992 | Martin | |
| RE34,100 E | 10/1992 | Hartness | |
| 5,222,046 A | 6/1993 | Kreifels et al. | |
| 5,297,148 A | 3/1994 | Harari et al. | |

(Continued)

FOREIGN PATENT DOCUMENTS

| | | |
|---|---|---|
| JP | 2005142859 A | 6/2005 |
| JP | 2005-309847 | 11/2005 |

(Continued)

OTHER PUBLICATIONS

Office Action dated Oct. 5, 2015 for Taiwanese Application No. 103105076.

(Continued)

*Primary Examiner* — Idriss N Alrobaye
*Assistant Examiner* — Ronald Modo

(57) ABSTRACT

In an embodiment of the invention, a method for to use a two level linked list descriptor mechanism to pass information among flash, memory, and IO controller modules is presented. The method includes creating a first level data structure for one or more first level descriptors; creating a second level data structure for one or more second level descriptors, each second level descriptor having a pointer to tracking information that includes start information, running information, and rewind information for a data DMA; using the one or more second level descriptors, the one or more first level descriptors, and the tracking information for a data DMA; updating the tracking information during the data DMA; and updating the tracking information at the end of the data DMA.

20 Claims, 20 Drawing Sheets

(56) References Cited

U.S. PATENT DOCUMENTS

| | | | |
|---|---|---|---|
| 5,339,404 A | 8/1994 | Vandling, III | |
| 5,341,339 A | 8/1994 | Wells | |
| 5,371,709 A | 12/1994 | Fisher et al. | |
| 5,379,401 A | 1/1995 | Robinson et al. | |
| 5,388,083 A | 2/1995 | Assar et al. | |
| 5,396,468 A | 3/1995 | Harari et al. | |
| 5,406,529 A | 4/1995 | Asano | |
| 5,432,748 A | 7/1995 | Hsu et al. | |
| 5,448,577 A | 9/1995 | Wells et al. | |
| 5,459,850 A | 10/1995 | Clay et al. | |
| 5,479,638 A | 12/1995 | Assar et al. | |
| 5,485,595 A | 1/1996 | Assar et al. | |
| 5,488,711 A | 1/1996 | Hewitt et al. | |
| 5,500,826 A | 3/1996 | Hsu et al. | |
| 5,509,134 A | 4/1996 | Fandrich et al. | |
| 5,513,138 A | 4/1996 | Manabe et al. | |
| 5,522,065 A | 5/1996 | Neufeld | |
| 5,524,231 A | 6/1996 | Brown | |
| 5,530,828 A | 6/1996 | Kaki et al. | |
| 5,535,328 A | 7/1996 | Harari et al. | |
| 5,535,356 A | 7/1996 | Kim et al. | |
| 5,542,042 A | 7/1996 | Manson | |
| 5,542,082 A | 7/1996 | Solhjell | |
| 5,548,741 A | 8/1996 | Watanabe | |
| 5,559,956 A | 9/1996 | Sukegawa | |
| 5,568,423 A | 10/1996 | Jou et al. | |
| 5,568,439 A | 10/1996 | Harari | |
| 5,572,466 A | 11/1996 | Sukegawa | |
| 5,594,883 A | 1/1997 | Pricer | |
| 5,602,987 A | 2/1997 | Harari et al. | |
| 5,603,001 A | 2/1997 | Sukegawa et al. | |
| 5,606,529 A | 2/1997 | Honma et al. | |
| 5,606,532 A | 2/1997 | Lambrache et al. | |
| 5,619,470 A | 4/1997 | Fukumoto | |
| 5,627,783 A | 5/1997 | Miyauchi | |
| 5,640,349 A | 6/1997 | Kakinuma et al. | |
| 5,644,784 A | 7/1997 | Peek | |
| 5,682,509 A | 10/1997 | Kabenjian | |
| 5,737,742 A | 4/1998 | Achiwa et al. | |
| 5,765,023 A | 6/1998 | Leger et al. | |
| 5,787,466 A | 7/1998 | Berliner | |
| 5,796,182 A | 8/1998 | Martin | |
| 5,799,200 A | 8/1998 | Brant et al. | |
| 5,802,554 A | 9/1998 | Caceres et al. | |
| 5,818,029 A | 10/1998 | Thomson | |
| 5,819,307 A | 10/1998 | Iwamoto et al. | |
| 5,822,251 A | 10/1998 | Bruce et al. | |
| 5,864,653 A | 1/1999 | Tavallaei et al. | |
| 5,870,627 A | 2/1999 | O'Toole et al. | |
| 5,875,351 A | 2/1999 | Riley | |
| 5,881,264 A | 3/1999 | Kurosawa | |
| 5,913,215 A | 6/1999 | Rubinstein et al. | |
| 5,918,033 A | 6/1999 | Heeb et al. | |
| 5,930,481 A | 7/1999 | Benhase | |
| 5,933,849 A | 8/1999 | Srbljic et al. | |
| 5,943,421 A | 8/1999 | Grabon | |
| 5,956,743 A | 9/1999 | Bruce et al. | |
| 5,978,866 A | 11/1999 | Nain | |
| 5,987,621 A | 11/1999 | Duso | |
| 6,000,006 A | 12/1999 | Bruce et al. | |
| 6,014,709 A | 1/2000 | Gulick et al. | |
| 6,070,182 A | 5/2000 | Rao et al. | |
| 6,076,137 A | 6/2000 | Asnaashari | |
| 6,098,119 A | 8/2000 | Surugucchi et al. | |
| 6,128,303 A | 10/2000 | Bergantino | |
| 6,138,200 A | 10/2000 | Ogilvie | |
| 6,138,247 A | 10/2000 | McKay et al. | |
| 6,151,641 A | 11/2000 | Herbert | |
| 6,215,875 B1 | 4/2001 | Nohda | |
| 6,230,269 B1 | 5/2001 | Spies et al. | |
| 6,298,071 B1 | 10/2001 | Taylor et al. | |
| 6,341,342 B1 | 1/2002 | Thompson et al. | |
| 6,363,441 B1 | 3/2002 | Beniz et al. | |
| 6,363,444 B1 | 3/2002 | Platko et al. | |
| 6,397,267 B1 | 5/2002 | Chong, Jr. | |
| 6,404,772 B1 | 6/2002 | Beach et al. | |
| 6,452,602 B1 | 9/2002 | Morein | |
| 6,496,939 B2 | 12/2002 | Portman et al. | |
| 6,526,506 B1 | 2/2003 | Lewis | |
| 6,529,416 B2 | 3/2003 | Bruce et al. | |
| 6,557,095 B1 | 4/2003 | Henstrom | |
| 6,574,142 B2 | 6/2003 | Gelke | |
| 6,601,126 B1 | 7/2003 | Zaidi et al. | |
| 6,678,754 B1* | 1/2004 | Soulier | G06F 13/28 710/22 |
| 6,728,840 B1 | 4/2004 | Shatil et al. | |
| 6,744,635 B2 | 6/2004 | Portman et al. | |
| 6,785,746 B1 | 8/2004 | Mahmoud et al. | |
| 6,757,845 B2 | 12/2004 | Bruce | |
| 6,857,076 B1 | 2/2005 | Klein | |
| 6,901,499 B2 | 5/2005 | Aasheim et al. | |
| 6,922,391 B1 | 7/2005 | King et al. | |
| 6,961,805 B2 | 11/2005 | Lakhani et al. | |
| 6,970,446 B2 | 11/2005 | Krischer et al. | |
| 6,970,890 B1 | 11/2005 | Bruce et al. | |
| 6,973,546 B2 | 12/2005 | Johnson | |
| 6,980,795 B1 | 12/2005 | Hermann et al. | |
| 7,103,684 B2 | 9/2006 | Chen et al. | |
| 7,174,438 B2 | 2/2007 | Homma et al. | |
| 7,194,766 B2 | 3/2007 | Noehring et al. | |
| 7,263,006 B2 | 8/2007 | Aritome | |
| 7,283,629 B2 | 10/2007 | Kaler et al. | |
| 7,305,548 B2 | 12/2007 | Pierce et al. | |
| 7,330,954 B2 | 2/2008 | Nangle | |
| 7,372,962 B2 | 5/2008 | Fujimoto et al. | |
| 7,386,662 B1 | 6/2008 | Kekre et al. | |
| 7,412,631 B2 | 8/2008 | Uddenberg et al. | |
| 7,415,549 B2* | 8/2008 | Vemula | G06F 13/28 710/22 |
| 7,424,553 B1* | 9/2008 | Borrelli | H04L 49/90 709/230 |
| 7,430,650 B1 | 9/2008 | Ross | |
| 7,474,926 B1 | 1/2009 | Carr et al. | |
| 7,478,186 B1 | 1/2009 | Onufryk et al. | |
| 7,490,177 B2 | 2/2009 | Kao | |
| 7,496,699 B2 | 2/2009 | Pope et al. | |
| 7,500,063 B2 | 3/2009 | Zohar et al. | |
| 7,506,098 B2 | 3/2009 | Arcedera et al. | |
| 7,613,876 B2 | 11/2009 | Bruce et al. | |
| 7,620,748 B1 | 11/2009 | Bruce et al. | |
| 7,620,749 B2 | 11/2009 | Biran et al. | |
| 7,624,239 B2 | 11/2009 | Bennett et al. | |
| 7,636,801 B1 | 12/2009 | Kekre et al. | |
| 7,660,941 B2 | 2/2010 | Lee et al. | |
| 7,668,925 B1 | 2/2010 | Liao et al. | |
| 7,676,640 B2 | 3/2010 | Chow | |
| 7,681,188 B1 | 3/2010 | Tirumalai et al. | |
| 7,716,389 B1 | 5/2010 | Bruce et al. | |
| 7,719,287 B2 | 5/2010 | Marks et al. | |
| 7,729,370 B1 | 6/2010 | Orcine et al. | |
| 7,743,202 B2 | 6/2010 | Tsai et al. | |
| 7,765,359 B2 | 7/2010 | Kang et al. | |
| 7,877,639 B2 | 1/2011 | Hoang | |
| 7,913,073 B2 | 3/2011 | Choi | |
| 7,921,237 B1 | 4/2011 | Holland et al. | |
| 7,934,052 B2 | 4/2011 | Prins et al. | |
| 7,958,295 B1 | 6/2011 | Liao et al. | |
| 7,979,614 B1 | 7/2011 | Yang | |
| 7,996,581 B2 | 8/2011 | Bond et al. | |
| 8,010,740 B2 | 10/2011 | Arcedera et al. | |
| 8,032,700 B2 | 10/2011 | Bruce et al. | |
| 8,156,279 B2 | 4/2012 | Tanaka et al. | |
| 8,156,320 B2 | 4/2012 | Borras | |
| 8,161,223 B1 | 4/2012 | Chamseddine et al. | |
| 8,165,301 B1 | 4/2012 | Bruce et al. | |
| 8,200,879 B1 | 6/2012 | Falik et al. | |
| 8,219,719 B1 | 7/2012 | Parry et al. | |
| 8,225,022 B2 | 7/2012 | Caulkins | |
| 8,266,342 B1 | 9/2012 | Takada et al. | |
| 8,341,300 B1 | 12/2012 | Karamcheti | |
| 8,341,311 B1 | 12/2012 | Szewerenko et al. | |
| 8,375,257 B2 | 2/2013 | Hong et al. | |
| 8,447,908 B2 | 4/2013 | Bruce et al. | |
| 8,489,914 B2 | 7/2013 | Cagno | |

(56) References Cited

U.S. PATENT DOCUMENTS

| | | |
|---|---|---|
| 8,510,631 B2 | 8/2013 | Wu et al. |
| 8,560,804 B2 | 10/2013 | Bruce et al. |
| 8,583,868 B2 | 11/2013 | Belluomini et al. |
| 8,677,042 B2 | 3/2014 | Gupta et al. |
| 8,707,134 B2 | 4/2014 | Takahashi et al. |
| 8,713,417 B2 | 4/2014 | Jo |
| 8,762,609 B1 | 6/2014 | Lam et al. |
| 8,788,725 B2 | 7/2014 | Bruce et al. |
| 8,832,371 B2 | 9/2014 | Uehara et al. |
| 8,856,392 B2 | 10/2014 | Myrah et al. |
| 8,959,307 B1 | 2/2015 | Bruce et al. |
| 9,043,669 B1 | 5/2015 | Bruce et al. |
| 9,099,187 B2 | 8/2015 | Bruce et al. |
| 9,135,190 B1 | 9/2015 | Bruce et al. |
| 9,147,500 B2 | 9/2015 | Kim et al. |
| 9,158,661 B2 | 10/2015 | Blaine et al. |
| 9,201,790 B2 | 12/2015 | Keeler |
| 9,400,617 B2 | 7/2016 | Ponce et al. |
| 2001/0010066 A1 | 7/2001 | Chin et al. |
| 2002/0011607 A1 | 1/2002 | Gelke et al. |
| 2002/0013880 A1 | 1/2002 | Gappisch et al. |
| 2002/0044486 A1 | 4/2002 | Chan et al. |
| 2002/0073324 A1 | 6/2002 | Hsu et al. |
| 2002/0083262 A1 | 6/2002 | Fukuzumi |
| 2002/0083264 A1 | 6/2002 | Coulson |
| 2002/0141244 A1 | 10/2002 | Bruce et al. |
| 2003/0023817 A1 | 1/2003 | Rowlands et al. |
| 2003/0065836 A1 | 4/2003 | Pecone |
| 2003/0097248 A1 | 5/2003 | Terashima et al. |
| 2003/0120864 A1 | 6/2003 | Lee et al. |
| 2003/0126451 A1 | 7/2003 | Gorobets |
| 2003/0131201 A1 | 7/2003 | Khare et al. |
| 2003/0161355 A1 | 8/2003 | Falcomato et al. |
| 2003/0163624 A1 | 8/2003 | Matsui et al. |
| 2003/0163647 A1 | 8/2003 | Cameron et al. |
| 2003/0163649 A1 | 8/2003 | Kapur et al. |
| 2003/0182576 A1 | 9/2003 | Morlang et al. |
| 2003/0188100 A1 | 10/2003 | Solomon et al. |
| 2003/0204675 A1 | 10/2003 | Dover et al. |
| 2003/0217202 A1 | 11/2003 | Zilberman et al. |
| 2003/0223585 A1 | 12/2003 | Tardo et al. |
| 2004/0073721 A1 | 4/2004 | Goff et al. |
| 2004/0078632 A1 | 4/2004 | Infante et al. |
| 2004/0128553 A1 | 7/2004 | Buer et al. |
| 2004/0186931 A1 | 9/2004 | Maine |
| 2004/0215868 A1 | 10/2004 | Solomon et al. |
| 2005/0050245 A1 | 3/2005 | Miller et al. |
| 2005/0055481 A1 | 3/2005 | Chou et al. |
| 2005/0078016 A1 | 4/2005 | Neff |
| 2005/0097263 A1 | 5/2005 | Wurzburg |
| 2005/0097368 A1 | 5/2005 | Peinado et al. |
| 2005/0120146 A1 | 6/2005 | Chen et al. |
| 2005/0210149 A1 | 9/2005 | Kimball |
| 2005/0210159 A1 | 9/2005 | Voorhees et al. |
| 2005/0226407 A1 | 10/2005 | Kasuya et al. |
| 2005/0240707 A1 | 10/2005 | Hayashi et al. |
| 2005/0243610 A1 | 11/2005 | Guha et al. |
| 2005/0289361 A1 | 12/2005 | Sutardja |
| 2006/0004957 A1 | 1/2006 | Hand III, et al. |
| 2006/0026329 A1 | 2/2006 | Yu |
| 2006/0031450 A1 | 2/2006 | Unrau et al. |
| 2006/0039406 A1 | 2/2006 | Day et al. |
| 2006/0064520 A1 | 3/2006 | Anand et al. |
| 2006/0095709 A1 | 5/2006 | Achiwa |
| 2006/0112251 A1 | 5/2006 | Karr et al. |
| 2006/0129876 A1 | 6/2006 | Uemura |
| 2006/0173970 A1 | 8/2006 | Pope et al. |
| 2006/0184723 A1 | 8/2006 | Sinclair et al. |
| 2007/0019573 A1 | 1/2007 | Nishimura |
| 2007/0028040 A1 | 2/2007 | Sinclair |
| 2007/0058478 A1 | 3/2007 | Murayama |
| 2007/0073922 A1 | 3/2007 | Go et al. |
| 2007/0079017 A1 | 4/2007 | Brink et al. |
| 2007/0083680 A1 | 4/2007 | King et al. |
| 2007/0088864 A1 | 4/2007 | Foster |
| 2007/0093124 A1 | 4/2007 | Varney et al. |
| 2007/0094450 A1 | 4/2007 | VanderWiel |
| 2007/0096785 A1 | 5/2007 | Maeda |
| 2007/0121499 A1 | 5/2007 | Pal et al. |
| 2007/0130439 A1 | 6/2007 | Andersson et al. |
| 2007/0159885 A1 | 7/2007 | Gorobets |
| 2007/0168754 A1 | 7/2007 | Zohar et al. |
| 2007/0174493 A1 | 7/2007 | Irish et al. |
| 2007/0174506 A1 | 7/2007 | Tsuruta |
| 2007/0195957 A1 | 8/2007 | Arulambalam et al. |
| 2007/0288686 A1 | 12/2007 | Arcedera et al. |
| 2007/0288692 A1 | 12/2007 | Bruce et al. |
| 2007/0294572 A1 | 12/2007 | Kalwitz et al. |
| 2007/0299996 A1 | 12/2007 | Guy et al. |
| 2008/0005481 A1 | 1/2008 | Walker |
| 2008/0052456 A1 | 2/2008 | Ash et al. |
| 2008/0052585 A1 | 2/2008 | LaBerge et al. |
| 2008/0072031 A1 | 3/2008 | Choi |
| 2008/0104264 A1 | 5/2008 | Duerk et al. |
| 2008/0140724 A1 | 6/2008 | Flynn et al. |
| 2008/0147963 A1 | 6/2008 | Tsai et al. |
| 2008/0189466 A1 | 8/2008 | Hemmi |
| 2008/0195800 A1 | 8/2008 | Lee et al. |
| 2008/0218230 A1 | 9/2008 | Shim |
| 2008/0228959 A1 | 9/2008 | Wang |
| 2008/0276037 A1 | 11/2008 | Chang et al. |
| 2008/0301256 A1 | 12/2008 | McWilliams et al. |
| 2009/0028229 A1 | 1/2009 | Cagno et al. |
| 2009/0037565 A1 | 2/2009 | Andresen et al. |
| 2009/0055573 A1 | 2/2009 | Ito |
| 2009/0077306 A1 | 3/2009 | Arcedera et al. |
| 2009/0083022 A1 | 3/2009 | Bin Mohd Nordin et al. |
| 2009/0094411 A1 | 4/2009 | Que |
| 2009/0132620 A1 | 5/2009 | Arakawa |
| 2009/0132752 A1 | 5/2009 | Poo et al. |
| 2009/0150643 A1 | 6/2009 | Jones et al. |
| 2009/0158085 A1 | 6/2009 | Kern et al. |
| 2009/0172250 A1 | 7/2009 | Allen et al. |
| 2009/0172261 A1 | 7/2009 | Prins et al. |
| 2009/0172466 A1 | 7/2009 | Royer et al. |
| 2009/0240873 A1 | 9/2009 | Yu et al. |
| 2010/0058045 A1 | 3/2010 | Borras et al. |
| 2010/0095053 A1 | 4/2010 | Bruce et al. |
| 2010/0125695 A1 | 5/2010 | Wu et al. |
| 2010/0250806 A1 | 9/2010 | Devilla et al. |
| 2010/0268904 A1 | 10/2010 | Sheffield et al. |
| 2010/0299538 A1 | 11/2010 | Miller |
| 2010/0318706 A1 | 12/2010 | Kobayashi |
| 2011/0022778 A1 | 1/2011 | Schibilla et al. |
| 2011/0022783 A1 | 1/2011 | Moshayedi |
| 2011/0022801 A1 | 1/2011 | Flynn |
| 2011/0087833 A1 | 4/2011 | Jones |
| 2011/0093648 A1 | 4/2011 | Belluomini et al. |
| 2011/0113186 A1 | 5/2011 | Bruce et al. |
| 2011/0133826 A1 | 6/2011 | Jones et al. |
| 2011/0145479 A1 | 6/2011 | Talagala et al. |
| 2011/0161568 A1 | 6/2011 | Bruce et al. |
| 2011/0167204 A1 | 7/2011 | Estakhri et al. |
| 2011/0173383 A1 | 7/2011 | Gorobets |
| 2011/0197011 A1 | 8/2011 | Suzuki et al. |
| 2011/0202709 A1 | 8/2011 | Rychlik |
| 2011/0208901 A1 | 8/2011 | Kim et al. |
| 2011/0208914 A1 | 8/2011 | Winokur et al. |
| 2011/0219150 A1 | 9/2011 | Piccirillo et al. |
| 2011/0258405 A1 | 10/2011 | Asaki et al. |
| 2011/0264884 A1 | 10/2011 | Kim |
| 2011/0264949 A1 | 10/2011 | Ikeuchi et al. |
| 2011/0270979 A1 | 11/2011 | Schlansker et al. |
| 2012/0005405 A1 | 1/2012 | Wu et al. |
| 2012/0005410 A1 | 1/2012 | Ikeuchi |
| 2012/0017037 A1 | 1/2012 | Riddle et al. |
| 2012/0079352 A1 | 3/2012 | Frost et al. |
| 2012/0102263 A1 | 4/2012 | Aswadhati |
| 2012/0102268 A1 | 4/2012 | Smith et al. |
| 2012/0137050 A1 | 5/2012 | Wang et al. |
| 2012/0159029 A1 | 6/2012 | Krishnan et al. |
| 2012/0161568 A1 | 6/2012 | Umemoto et al. |
| 2012/0173795 A1 | 7/2012 | Schuette et al. |
| 2012/0215973 A1 | 8/2012 | Cagno et al. |

(56) References Cited

U.S. PATENT DOCUMENTS

| | | |
|---|---|---|
| 2012/0249302 A1 | 10/2012 | Szu |
| 2012/0260102 A1 | 10/2012 | Zaks et al. |
| 2012/0271967 A1 | 10/2012 | Hirschman |
| 2012/0303924 A1 | 11/2012 | Ross |
| 2012/0311197 A1 | 12/2012 | Larson et al. |
| 2012/0324277 A1 | 12/2012 | Weston-Lewis et al. |
| 2013/0010058 A1 | 1/2013 | Pomeroy |
| 2013/0019053 A1 | 1/2013 | Somanache et al. |
| 2013/0073821 A1 | 3/2013 | Flynn et al. |
| 2013/0094312 A1 | 4/2013 | Jang et al. |
| 2013/0099838 A1 | 4/2013 | Kim et al. |
| 2013/0111135 A1 | 5/2013 | Bell, Jr. et al. |
| 2013/0206837 A1 | 8/2013 | Szu |
| 2013/0208546 A1 | 8/2013 | Kim et al. |
| 2013/0212337 A1 | 8/2013 | Maruyama |
| 2013/0212349 A1 | 8/2013 | Maruyama |
| 2013/0212425 A1 | 8/2013 | Blaine et al. |
| 2013/0246694 A1 | 9/2013 | Bruce et al. |
| 2013/0254435 A1 | 9/2013 | Shapiro et al. |
| 2013/0262750 A1 | 10/2013 | Yamasaki et al. |
| 2013/0282933 A1 | 10/2013 | Jokinen et al. |
| 2013/0304775 A1 | 11/2013 | Davis et al. |
| 2013/0339578 A1 | 12/2013 | Ohya et al. |
| 2013/0339582 A1 | 12/2013 | Olbrich et al. |
| 2013/0346672 A1 | 12/2013 | Sengupta et al. |
| 2014/0068177 A1 | 3/2014 | Raghavan |
| 2014/0095803 A1 | 4/2014 | Kim et al. |
| 2014/0104949 A1 | 4/2014 | Bruce et al. |
| 2014/0108869 A1* | 4/2014 | Brewerton .......... G06F 11/1048 714/42 |
| 2014/0189203 A1 | 7/2014 | Suzuki et al. |
| 2014/0258788 A1 | 9/2014 | Maruyama |
| 2014/0285211 A1 | 9/2014 | Raffinan |
| 2014/0331034 A1 | 11/2014 | Ponce et al. |
| 2015/0006766 A1 | 1/2015 | Ponce et al. |
| 2015/0012690 A1 | 1/2015 | Bruce et al. |
| 2015/0032937 A1 | 1/2015 | Salessi |
| 2015/0032938 A1 | 1/2015 | Salessi |
| 2015/0067243 A1 | 3/2015 | Salessi et al. |
| 2015/0149697 A1 | 5/2015 | Salessi et al. |
| 2015/0149706 A1 | 5/2015 | Salessi et al. |
| 2015/0153962 A1 | 6/2015 | Salessi et al. |
| 2015/0169021 A1 | 6/2015 | Salessi et al. |
| 2015/0261456 A1 | 9/2015 | Alcantara et al. |
| 2015/0261475 A1 | 9/2015 | Alcantara et al. |
| 2015/0261797 A1 | 9/2015 | Alcantara et al. |
| 2015/0370670 A1 | 12/2015 | Lu |
| 2015/0371684 A1 | 12/2015 | Mataya |
| 2015/0378932 A1 | 12/2015 | Souri et al. |
| 2016/0026402 A1 | 1/2016 | Alcantara et al. |
| 2016/0027521 A1 | 1/2016 | Lu |
| 2016/0041596 A1 | 2/2016 | Alcantara et al. |

FOREIGN PATENT DOCUMENTS

| | | |
|---|---|---|
| TW | 489308 | 6/2002 |
| TW | 200428219 A | 12/2004 |
| TW | 436689 | 12/2005 |
| TW | I420316 | 12/2013 |
| WO | WO 94/06210 | 3/1994 |
| WO | WO 98/38568 | 9/1998 |

OTHER PUBLICATIONS

Office Action dated Nov. 19, 2015 for U.S. Appl. No. 14/217,249.
Office Action dated Nov. 18, 2015 for U.S. Appl. No. 14/217,467.
Office Action dated Dec. 4, 2015 for U.S. Appl. No. 14/616,700.
Office Action dated Jun. 4, 2015 for U.S. Appl. No. 14/215,414.
Office Action for U.S. Appl. No. 14/855,245 dated Oct. 26, 2016.
Office Action for U.S. Appl. No. 14/217,249 dated Oct. 28, 2016.
Office Action for U.S. Appl. No. 14/217,399 dated Nov. 1, 2016.
Office Action for U.S. Appl. No. 14/217,291 dated Nov. 3, 2016.
Office Action for U.S. Appl. No. 14/217,947 dated Nov. 4, 2016.
Office Action for U.S. Appl. No. 14/216,627 dated Nov. 7, 2016.
Office Action for U.S. Appl. No. 14/689,019 dated Nov. 18, 2016.
Office Action for U.S. Appl. No. 14/684,399 dated Nov. 21, 2016.
Notice of Allowance for U.S. Appl. No. 14/689,045 dated Nov. 21, 2016.
Notice of Allowance for U.S. Appl. No. 14/217,334 dated Nov. 23, 2016.
Office Action dated Dec. 5, 2014 for U.S. Appl. No. 14/038,684.
Office Action dated Oct. 8, 2015 for U.S. Appl. No. 14/217,291.
Notice of allowance/allowability for U.S. Appl. No. 13/253,912 dated Mar. 21, 2016.
Notice of allowance/allowability for U.S. Appl. No. 14/803,107 dated Mar. 28, 2016.
Office Action for U.S. Appl. No. 14/217,334 dated Apr. 4, 2016.
Robert Cooksey et al., A Stateless, Content-Directed Data Prefetching Mechanism, Copyright 2002 ACM.
Office Action for U.S. Appl. No. 14/866,946 dated Jul. 27 2017.
Office Action for U.S. Appl. No. 14/616,700 dated Jun. 2, 2017.
Office Action for U.S. Appl. No. 15/268,533 dated Jun. 2, 2017 (issued by Examiner in this application).
Office Action for U.S. Appl. No. 15/268,536 dated Apr. 27, 2017.
Office Action for U.S. Appl. No. 15/368,598 dated May 19, 2017.
Advisory Action for U.S. Appl. No. 14/690,305 dated Nov. 25, 2016.
Office Action for U.S. Appl. No. 14/216,937 dated Aug. 15, 2016.
Notice of Allowance for U.S. Appl. No. 14/217,096 dated Dec. 5, 2016.
Notice of Allowance for U.S. Appl. No. 14/217,161 dated Dec. 30, 2016.
Office Action for U.S. Appl. No. 14/866,946 dated Jan. 5, 2017.
Office Action for U.S. Appl. No. 14/688,209 dated Jan. 11, 2017.
Amazon Route 53 Developer Guide API Version Apr. 1, 2013, copyright 2017 by Amazon Web Services.
Host Bus Adapters (HBAs): What you need to know about networking workhorse by Alan Earls, Feb. 2003.
Office Action for U.S. Appl. No. 14/690,243 dated Jan. 13, 2017.
Office Action for U.S. Appl. No. 14/232,801 dated Jan. 19, 2017.
Notice of allowance/allowability for U.S. Appl. No. 14/217,365 dated Oct. 18, 2016.
Office Action for U.S. Appl. No. 14/217,291 dated Jun. 15, 2016.
Office Action for U.S. Appl. No. 14/217,316 dated Aug. 10, 2017.
Advisory Action for U.S. Appl. No. 14/690,305 dated Nov. 3, 2017.
Office Action for U.S. Appl. No. 14/690,305 dated Aug. 10, 2017.
Office Action for U.S. Appl. No. 14/217,291 dated Nov. 3, 2017.
Notice of Allowance/Allowability for U.S. Appl. No. 14/217,334 dated Aug. 4, 2017.
Advisory Action for U.S. Appl. No. 14/217,291 dated Aug. 9, 2017.
Office Action for U.S. Appl. No. 14/217,291 dated May 17, 2017.
Notice of Allowance for U.S. Appl. No. 14/215,414 dated Jan. 20, 2017.
Advisory Action for U.S. Appl. No. 14/217,249 dated Jan. 26, 2017.
Notice of Allowance for U.S. Appl. No. 14/687,700 dated Jan. 27, 2016.
Office Action for U.S. Appl. No. 14/690,339 dated Feb. 3, 2017.
Office Action for U.S. Appl. No. 14/616,700 dated Feb. 9, 2017.
Notice of Allowance for U.S. Appl. No. 14/217,365 dated Feb. 10, 2017.
Office Action for U.S. Appl. No. 14/690,349 dated Feb. 8, 2017.
Advisory Action for U.S. Appl. No. 14/689,019 dated Feb. 17, 2017.
Office Action for U.S. Appl. No. 14/690,349 dated Feb. 27, 2017.
Notice of allowance/allowability for U.S. Appl. No. 14/214,216 dated Apr. 27, 2016.
Notice of allowance/allowability for U.S. Appl. No. 14/217,436 dated May 6, 2016.
National Science Fountation,Award Abstract #1548968, SBIR Phase I: SSD In-Situ Processing, http://www.nsf.gov/awardsearch/showAward?AWD_ID=1548968 printed on Feb. 13, 2016.
Design-Reuse, NxGn Data Emerges from Stealth Mode to provide a paradigm shift in enterprise storage solution.
Office Action dated Dec. 15, 2015 for U.S. Appl. No. 13/253,912.
Office Action dated Dec. 17, 2015 for U.S. Appl. No. 14/214,216.
Office Action dated Dec. 17, 2015 for U.S. Appl. No. 14/215,414.
Office Action dated Dec. 17, 2015 for U.S. Appl. No. 14/803,107.

(56) References Cited

OTHER PUBLICATIONS

Office Action dated Jan. 17, 2016 for U.S. Appl. No. 14/866,946.
Office Action dated Jan. 11, 2016 for U.S. Appl. No. 14/217,399.
Office Action dated Jan. 15, 2016 for U.S. Appl. No. 14/216,937.
Notice of Allowance and Examiner-Initiated Interview Summary, dated Jan. 29, 2016 for U.S. Appl. No. 14/297,628.
Advisory Action for U.S. Appl. No. 14/217,334 dated Jun. 13, 2016.
Office Action for U.S. Appl. No. 12/876,113 dated Mar. 13, 2014.
Advisory Action for U.S. Appl. No. 12/876,113 dated Sep. 6, 2013.
Office Action for U.S. Appl. No. 12/876,113 dated May 14, 2013.
Office Action for U.S. Appl. No. 12/876,113 dated Dec. 21, 2012.
Notice of Allowability for U.S. Appl. No. 12/882,059 dated May 30, 2013.
Notice of Allowability for U.S. Appl. No. 12/882,059 dated Feb. 14, 2013.
Office Action for U.S. Appl. No. 12/882,059 dated May 11, 2012.
Notice of Allowability for U.S. Appl. No. 14/038,684 dated Aug. 1, 2014.
Office Action for U.S. Appl. No. 14/038,684 dated Mar. 17, 2014.
Notice of Allowance/Allowability for U.S. Appl. No. 13/890,229 dated Feb. 20, 2014.
Office Action for U.S. Appl. No. 13/890,229 dated Oct. 8, 2013.
Office Action for U.S. Appl. No. 12/876,113 dated Dec. 5, 2014.
Notice of Allowance/Allowabilty for U.S. Appl. No. 12/876,113 dated Jun. 22, 2015.
Office Action for U.S. Appl. No. 14/217,249 dated Apr. 23, 2015.
Office Action for U.S. Appl. No. 14/217,467 dated Apr. 27, 2015.
Office Action for U.S. Appl. No. 14/616,700 dated Apr. 30, 2015.
Office Action for U.S. Appl. No. 14/217,436 dated Sep. 11, 2015.
Office Action for U.S. Appl. No. 14/217,096 dated Jul. 12, 2016.
Notice of Allowance for U.S. Appl. No. 14/217,399 dated Jul. 20, 2016 (Mailed in this current application).
Office Action for U.S. Appl. No. 14/866,946 dated Jul. 29, 2016.
Notice of Allowance for U.S. Appl. No. 14/217,334 dated Jul. 29, 2016.
Office Action for U.S. Appl. No. 14/690,243 dated Aug. 11, 2016.
Office Action for U.S. Appl. No. 14/690,370 dated Aug. 12, 2016.
Working Draft American National Standard Project T10/1601-D Information Technology Serial Attached SCSI—1.1 (SAS—1.1), Mar. 13, 2004 Revision 4.
Final Office Action dated Nov. 19, 2015 for U.S. Appl. No. 14/217,249.
Final Office Action dated Nov. 18, 2015 for U.S. Appl. No. 14/217,467.
Office Action dated Nov. 25, 2015 for U.S. Appl. No. 14/217,041.
Office Action for U.S. Appl. No. 14/217,249 dated Apr. 21, 2016.
Notice of allowance/allowability for U.S. Appl. No. 14/217,467 dated Apr. 20, 2016.
Office Action for U.S. Appl. No. 14/215,414 dated May 20, 2016.
Office Action for U.S. Appl. No. 14/616,700 dated May 20, 2016.
Office Action for U.S. Appl. No. 14/689,019 dated May 20, 2016.
Advisory Action for U.S. Appl. No. 14/217,316 dated May 19, 2016.
Office Action for U.S. Appl. No. 14/217,365 dated Feb. 18, 2016.
Office Action for U.S. Appl. No. 14/217,365 dated Mar. 2, 2016.
Office Action for U.S. Appl. No. 14/690,305 dated Feb. 25, 2016.
Office Action for U.S. Appl. No. 14/217,436 dated Feb. 25, 2016.
Office Action for U.S. Appl. No. 14/217,316 dated Feb. 26, 2016.
Office Action for U.S. Appl. No. 14/215,414 dated Mar. 1, 2016.
Office Action for U.S. Appl. No. 14/616,700 dated Mar. 8, 2016.
Office Action for U.S. Appl. No. 13/253,912 dated Jul. 16, 2014.
Office Action for U.S. Appl. No. 13/475,878 dated Jun. 23, 2014.
Office Action for U.S. Appl. No. 12/876,113 dated Jul. 11, 2014.
Office Action for U.S. Appl. No. 12/876,113 dated Oct. 16, 2014.
Notice of Allowance for U.S. Appl. No. 12/270,626 dated Oct. 3, 2014.
Office Action for U.S. Appl. No. 12/270,626 dated May 23, 2014.
Office Action for U.S. Appl. No. 12/270,626 dated Apr. 4, 2011.
Office Action for U.S. Appl. No. 12/270,626 dated Dec. 18, 2013.
Office Action for U.S. Appl. No. 12/270,626 dated Mar. 15, 2013.
Office Action for U.S. Appl. No. 12/270,626 dated Aug. 23, 2012.
Office Action for U.S. Appl. No. 13/475,878, dated Jun. 23, 2014.
Office Action for U.S. Appl. No. 12/270,626 dated Feb. 3, 2012.
Notice of Allowance/Allowability for U.S. Appl. No. 12/270,626 dated Oct. 3, 2014.
Advisory Action for U.S. Appl. No. 12/876,113 dated Oct. 16, 2014.
Office Action for U.S. Appl. No. 14/297,628 dated Jul. 17, 2015.
Office Action for U.S. Appl. No. 13/475,878 dated Dec. 4, 2014.
USPTO Notice of Allowability & attachment(s) dated Jan. 7, 2013 for U.S. Appl. No. 12/876,247.
Office Action dated Sep. 14, 2012 for U.S. Appl. No. 12/876,247.
Office Action dated Feb. 1, 2012 for U.S. Appl. No. 12/876,247.
Notice of Allowance/Allowability dated Mar. 31, 2015 for U.S. Appl. No. 13/475,878.
Office Action dated May 22, 2015 for U.S. Appl. No. 13/253,912.
Office Action for U.S. Appl. No. 14/616,700 dated Oct. 20, 2016.
Notice of allowance/allowability for U.S. Appl. No. 14/217,041 dated Apr. 11, 2016.
Office Action for U.S. Appl. No. 14/217,316 dated Aug. 25, 2016.
Office Action for U.S. Appl. No. 14/690,305 dated Aug. 26, 2016.
Advisory Action for U.S. Appl. No. 14/217,291 dated Sep. 9, 2016.
Advisory Action for U.S. Appl. No. 14/689,045 dated Sep. 16, 2016.
Notice of Allowance for U.S. Appl. No. 14/182,303 dated Sep. 12, 2016.
Advisory Action for U.S. Appl. No. 14/690,114 dated Sep. 12, 2016.
Notice of Allowance for U.S. Appl. No. 14/215,414 dated Sep. 23, 2016.
Advisory Action for U.S. Appl. No. 14/866,946 dated Oct. 13, 2016.
Office Action for U.S. Appl. No. 14/687,700 dated Sep. 26, 2016.
Office Action for U.S. Appl. No. 15/170,768 dated Oct. 6, 2016.
Office Action dated Sep. 11, 2015 for U.S. Appl. No. 14/217,436.
Office Action dated Sep. 24, 2015 for U.S. Appl. No. 14/217,334.
Office Action dated Sep. 18, 2015 for Taiwanese Patent Application No. 102144165.
Office Action dated Sep. 29, 2015 for U.S. Appl. No. 14/217,316.
Office Action dated Sep. 28, 2015 for U.S. Appl. No. 14/689,045.
Advisory Action for U.S. Appl. No. 14/217,316 dated Jun. 15, 2017.
Office Action for U.S. Appl. No. 14/217,316 dated Mar. 23, 2017.
Office Action for U.S. Appl. No. 14/690,305 dated Feb. 10, 2017.
Advisory Action for U.S. Appl. No. 14/690,305 dated Nov. 25 2016.
Notice of Allowance/Allowability for U.S. Appl. No. 14/217,334 dated Mar. 23, 2017.

* cited by examiner

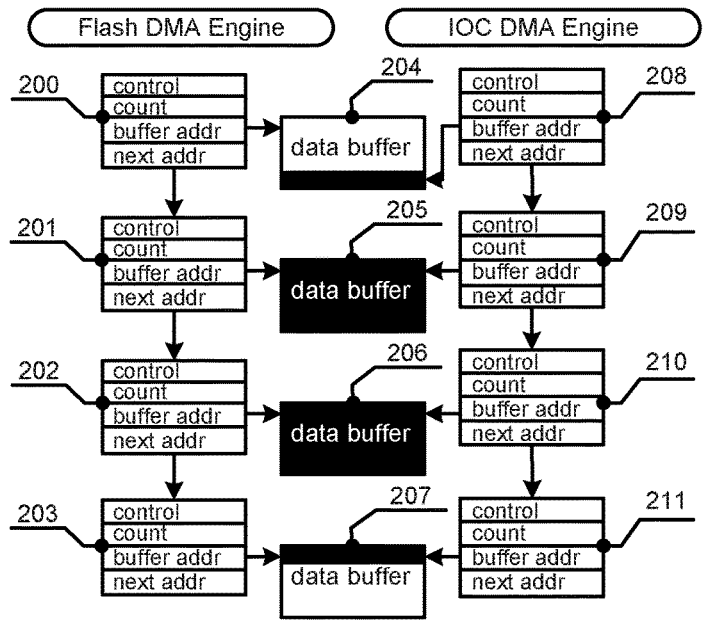
PRIOR ART FIG. 2
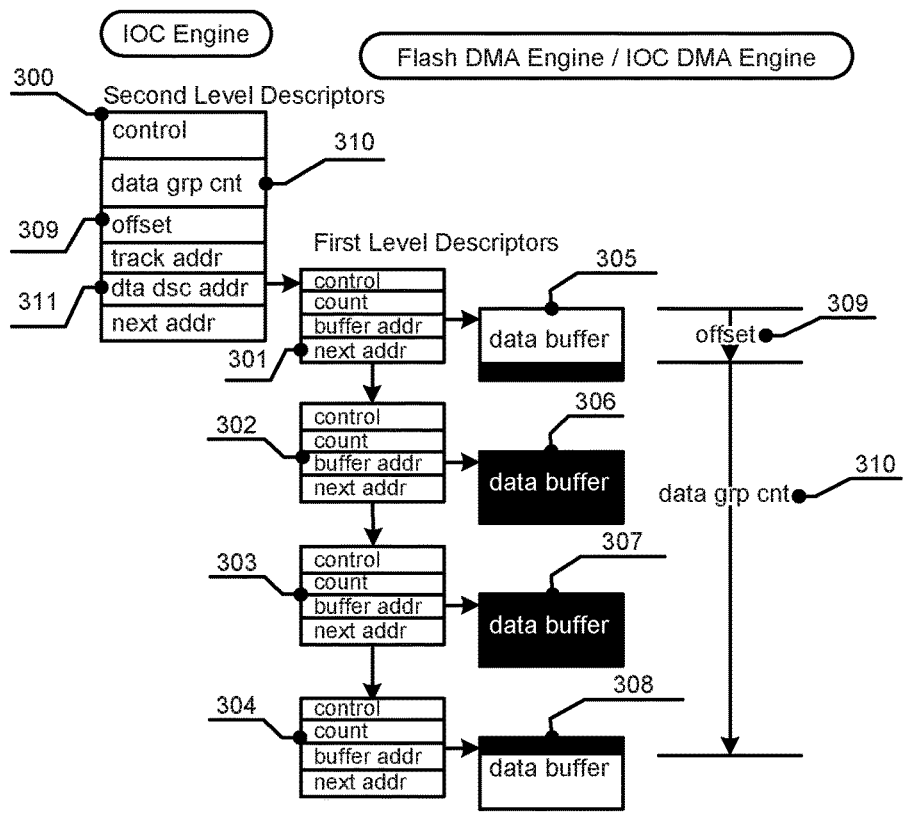
FIG. 3

MULTI-LEVEL MESSAGE PASSING DESCRIPTOR

CROSS-REFERENCE(S) TO RELATED APPLICATIONS

This application is a continuation of U.S. patent application Ser. No. 14/217,041, filed on 17 Mar. 2014, which claims the benefit of and priority to U.S. Provisional Application No. 61/800,395, filed 15 Mar. 2013. This U.S. Provisional Application No. 61/800,395 is hereby fully incorporated herein by reference. This U.S. patent application Ser. No. 14/217,041 is hereby fully incorporated herein by reference.

This application relates to U.S. Utility application Ser. No. 14/217,334, "Flash Electronic Disk With RAID Controller" which is hereby fully incorporated herein by reference and U.S. Utility application Ser. No. 14/217,316, "Flash Array RAID In Flash Electronic Disks" which is hereby fully incorporated herein by reference.

FIELD

Embodiments of the invention relate generally to memory systems.

DESCRIPTION OF RELATED ART

A simple linked list descriptor typically provides an indication of a number of data pointers contained in a subsequent descriptor. The number of data pointers contained in the subsequent descriptor is typically contained in the memory address of the subsequent descriptor. For example, the number of data pointers is used by a Direct Memory Access (DMA) controller or an Input Output (IO) controller and controls how many read cycles are performed when processing the subsequent descriptor. Therefore, the process of reading linked list descriptors from memory has been used to control DMA engines. The usual implementation of the linked list descriptors includes only one level of descriptors and their corresponding data/payload buffers. From the nature of the linked list, the processing of the descriptors is usually done sequentially. Failed DMA operations result in interrupt generation for firmware error handling.

SUMMARY

In one embodiment of the invention, a method and system for controlling control and data information in memory and IO controllers is presented here. The method and system uses a linked descriptor mechanism to pass the information. The minimal overhead allows subsequent linking of data, and at the same time allows much flexibility on the content of the payload. The simple linking mechanism reduces the CPU processing overhead requirement during data transfer and allows varying data length. The flexible payload content of the method allows it to support a wide range of IO protocols. This method also reduces design over head cost and complexity, by allowing a single module design to pass control and data information among flash, memory, and IO controller modules. This mechanism has provision for error recovery and retry in hardware. Message Passing Descriptors employ indexing and linked lists, with a link pointing to a link. Through the descriptors, elements may be added, read, or retried easily in hardware. Each descriptor indicates the address to the next descriptor. By generating interrupts and/or monitoring the changes in the head and tail of the descriptor list, modules pass messages to the Central Processing Unit (CPU) firmware (FW) and vice versa.

An embodiment of the present invention achieves minimum CPU FW intervention during DMA transfers. It is also an objective of the present invention to achieve hardware (HW) rewind capability in the descriptor structure. It is further an objective of the present invention to achieve addition of another link with pausing. It is further an objective of the present invention to achieve flexible, FW controlled IO to IO translation via buffer management and manipulation.

These and other implementations, their variations, applications, and associated advantages and benefits are described in greater detail in the attached drawings, the detailed description, and the claims. This summary does not purport to define the invention. The invention is defined by the claims.

BRIEF DESCRIPTION OF DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

FIG. 2 shows the limitation of the 1-level linked list according to conventional art.

FIG. 3 shows how a 2-level linked list, enables the use of descriptors according to an embodiment of the present invention.

DETAILED DESCRIPTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort would be a routine engineering undertaking for those of ordinary skill in the art having the benefit of this disclosure. The various embodiments disclosed herein are not intended to limit the scope and spirit of the herein disclosure.

Preferred embodiments for carrying out the principles of the present invention are described herein with reference to the drawings. However, the present invention is not limited to the specifically described and illustrated embodiments. A person skilled in the art will appreciate that many other embodiments are possible without deviating from the basic concept of the invention. Therefore, the principles of the present invention extend to any work that falls within the scope of the appended claims.

As used herein, the terms "a" and "an" herein do not denote a limitation of quantity, but rather denote the presence of at least one of the referenced items.

Figure 1:
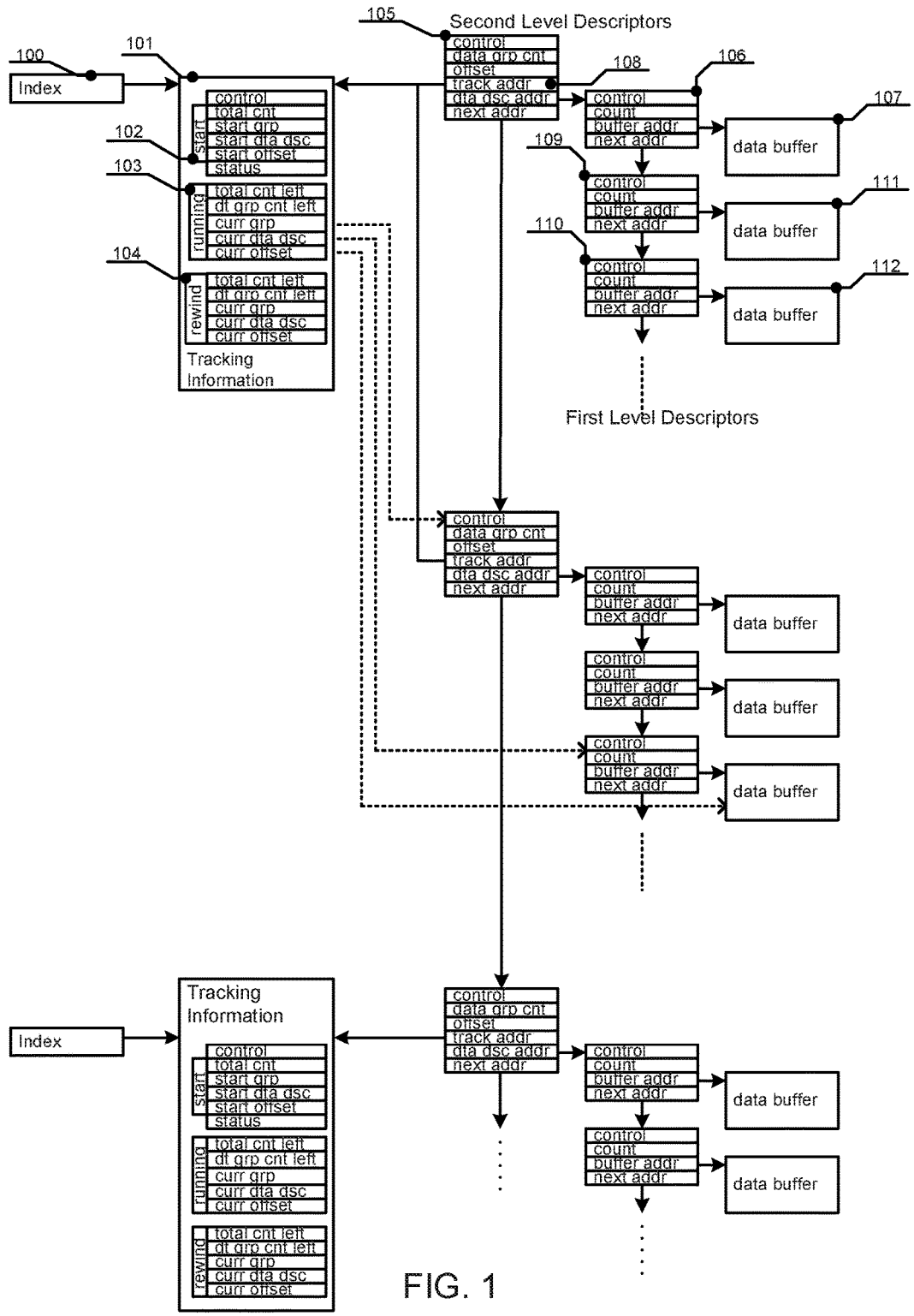
FIG. 1 shows a 2-level linked list according to an embodiment of the present invention.

FIG. 1 shows a 2-level linked list according to an embodiment of the present invention. A standard descriptor based linked list usually is made of only a first level of descriptors [106, 109, 110]. These descriptors point to their respective data buffers [107, 111, 112]. A standard first level descriptor [106] is simple to implement and has less overhead since the DMA module only has to fetch one level of descriptor [106] to enable the DMA. However, this approach has some limitations:

(1) Data sizes are native to a DMA module and needs translation to the data sizes for another DMA module, requiring different sets of first level of descriptors [106] for the other DMA module. Descriptors cannot be re-used because the descriptors for a DMA module cannot be used again by another DMA module with a different native data size transfer. Another set of descriptors is needed by the other DMA module.

(2) No rewind or retry capability in hardware, which can speed things up in Input Output Controller (IOC) DMA during error handling. IOCs (especially for the serial-based protocols like SAS or SATA) have a need for the capability to resend frames or packets that were not transferred error free. Frequently, a frame or multiple frames exceed the buffer size in the IOC module. This means that the IOC needs to re-fetch data from memory. With only one level of linked list descriptors, if an error occurs, the IOC needs to interrupt the firmware indicating that there is a need to resend the data. The interrupt handler of the firmware then determines the retry point of the data, and re-assembles the descriptor linked list for the IOC DMA. The IOC DMA then receives the new sets of descriptors, and can now proceed to resending the data. Going through the interrupt handler in firmware takes a significant amount of time from the hardware's perspective. To speed up the process, a hardware-assisted solution is needed. One embodiment of the invention includes keeping the tracking information (retry points) in a set of hardware registers, but this approach is limited to accessing one sequential, first level descriptor-based linked list only. Multiple random linked list structures need multiple sets of tracking information registers in hardware which are usually expensive.

To address limitation (1), one embodiment of the invention uses second level descriptors [105]. The second level descriptors [105] allow the first level descriptors to be shared between two DMA modules that have different native data sizes. The offset information in the second level descriptors [105] allows adjustment of the data for the other DMA module.

To address limitation (2), each second level descriptor [Ψ] has a pointer [108] to the tracking information [101] which can be used to search for the rewind info [104]. The tracking information has 3 main components: the start info [102], the running info [103], and the rewind info [104].

The start info [102] is controlled by firmware and is a static value. Hardware uses this only as a reference to where the data DMA (controlled by the tracking information) starts.

The running info [103] is controlled by the hardware. It is initially equal to the start info [102]. As the DMA progresses, this info is updated by the hardware. This allows the hardware to track the data that it has already transferred, so it knows where to continue the DMA, if the tracking info is accessed again.

The rewind info [104] is controlled by the hardware. It is initially equal to the start info [102]. This is updated by the hardware after the partial data transfer was transferred error free. This tells the hardware where the last error-free data transfer was completed, so it can return back to this point (rewind) if an error occurred in the data that followed.

As an option, in one embodiment the tracking information [101] is located by the use of a tracking index [100]. This allows the DMA engine to traverse the descriptor system by either sequentially following the next address entry of the second level descriptors [105] or by jumping to the desired tracking information by using the tracking index [100]. Traversal using the tracking index is particularly useful for IOC DMA if the data for one IOC command is located in a linked list structure controlled by tracking information [101]. The tracking index [100] is the index in a tracking info address table in memory that contains the address to the desired tracking information [101]. By using the tracking index [100], the IOC DMA can look up the tracking info address table to get the corresponding address of the tracking info.

FIG. 2 shows the limitation of the one level linked list according to prior art. In this figure there are two sets of descriptors that are used by two DMA engines: the Flash DMA engine and the IOC DMA engine. These two DMA engines usually work in tandem if there is a flash to IOC transfer or vise versa, in the storage system. These transfers usually need a SRAM or SDRAM memory or an equivalent memory between the two DMA engines where data can be buffered. The Flash DMA engine takes care of transferring data between the flash and the memory, and the IOC DMA engine takes care of transferring data between the IOC and the memory. To access their respective data in memory, the Flash DMA engine and IOC DMA engine need their respective buffer addresses, each of which points to the first data buffer location needed by the corresponding DMA engine.

For this example, the memory read data the IOC DMA needs is in the darkened areas in the data buffers [204 to 207], since IOC commands may be Logical Block Address (LBA) based and can access any data in the LBA space. As seen here the end part of the first data buffer [204], all of the middle buffers [205 & 206], and the begin part of the last buffer [207] are needed by the IOC DMA engine.

For the Flash DMA Engine side, the memory write data required for transfer is the complete buffer size for all four data buffers [204 to 207]. This is due to the native data access of the Flash chip (or even the rotating media) which has a certain limit to the minimum addressable data size.

The native data access of a physical device like a flash chip or rotating media is tied to the minimum block size access of the media. For example, for rotating drives the minimum block size (1 sector) is 512 bytes, and the start addresses of their data buffers in memory are multiples of 512 bytes. IOC commands on the other hand can access any random data in the LBA space, and the start addresses of their data buffers can be anywhere in the memory space and are not constrained. This difference leads to different start addresses (and even buffer sizes) for the Flash DMA engine and IOC DMA engine.

For this setup, the firmware needs to construct two sets of first level linked list descriptors [200 to 203] and [208 to 211]. The first set of descriptors [200 to 203] is used by the Flash DMA engine, and the second set of descriptors [208 to 211] is used by the IOC DMA engine.

FIG. 3 shows how a two-level linked list enables the use of descriptors according to an embodiment of the present invention. For this example, the memory read data the IOC DMA engine needs is the black areas in the data buffers [305 to 308]. As seen here, the end part of the first data buffer [305], all of the middle buffers [306 & 307], and the begin part of the last buffer [308] are needed by the IOC DMA engine.

For the Flash DMA engine side, the memory write data required for transfer is the complete buffer size for all four data buffers [305 to 308]. This is due to the native data access of the Flash chip (or even the rotating media) which has a certain limit to the minimum addressable data size.

For this setup, the firmware needs to construct only one set of first level linked list descriptors [301 to 304] which is used by both the Flash DMA Engine and the IOC DMA engine. The IOC DMA engine has an additional second level descriptor [300]. The second level descriptor [300] has a first level descriptor address [311] which has the address of the starting first level descriptor [301]. The second level descriptor [300] also has offset [309] info and data group count [310] info. The offset [309] info allows the IOC DMA engine to select the proper data offset in the first buffer [305] for the start the IOC DMA. The data offset is the address offset counted from the start address of the data buffer. If the first level descriptors [301 to 304] have multiple data buffer entries, the offset [309] also contains the data buffer address entry number. The data group count [310] info provides the IOC DMA engine with the data end limit in the last buffer [308] for the end of the IOC DMA. The data group count [310] specifies the total data transfer count needed by the second level descriptor, so that once the data group count [310] is done, the IOC DMA engine then proceeds to the next second level descriptor, as also similarly described below when the data group count [401] is done.

Figure 4:
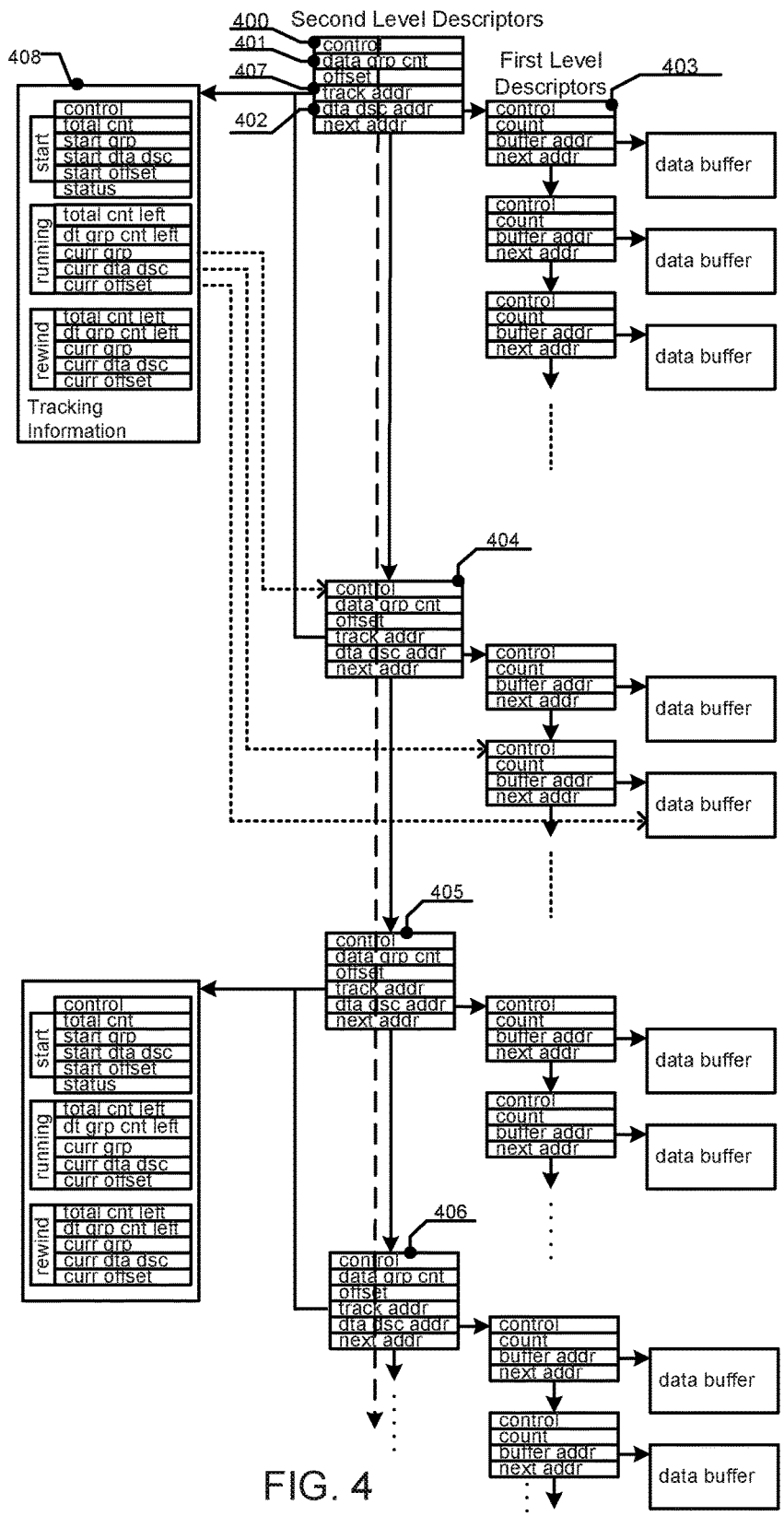
FIG. 4 shows a sequential linked list traversal according to an embodiment of the present invention.

FIG. 4 shows the sequential linked list traversal according to an embodiment of the present invention. FIG. 4 shows traversal of the linked list using the second level descriptors [400, 404, 405, 406]. The IOC DMA engine initially receives the pointer to the head second level descriptor [400]. The second level descriptor [400] has a first level (data) descriptor address [402] which has the address of the starting first level descriptor [403]. Using the first level (data) descriptor address [402], the IOC DMA engine can now traverse the first level descriptors [403] of this second level descriptor [400]. Once the data group count [401] is done, the IOC DMA engine then proceeds to the next second level descriptor [404], and the process is repeated until all the descriptors are processed. The second level descriptor [400] has a track address [407] that gives that location of the tracking info [408]. The tracking info [408] is being updated by the IOC DMA engine and is used as reference for possible retries and to check the current state of the data transfer.

Figure 5:
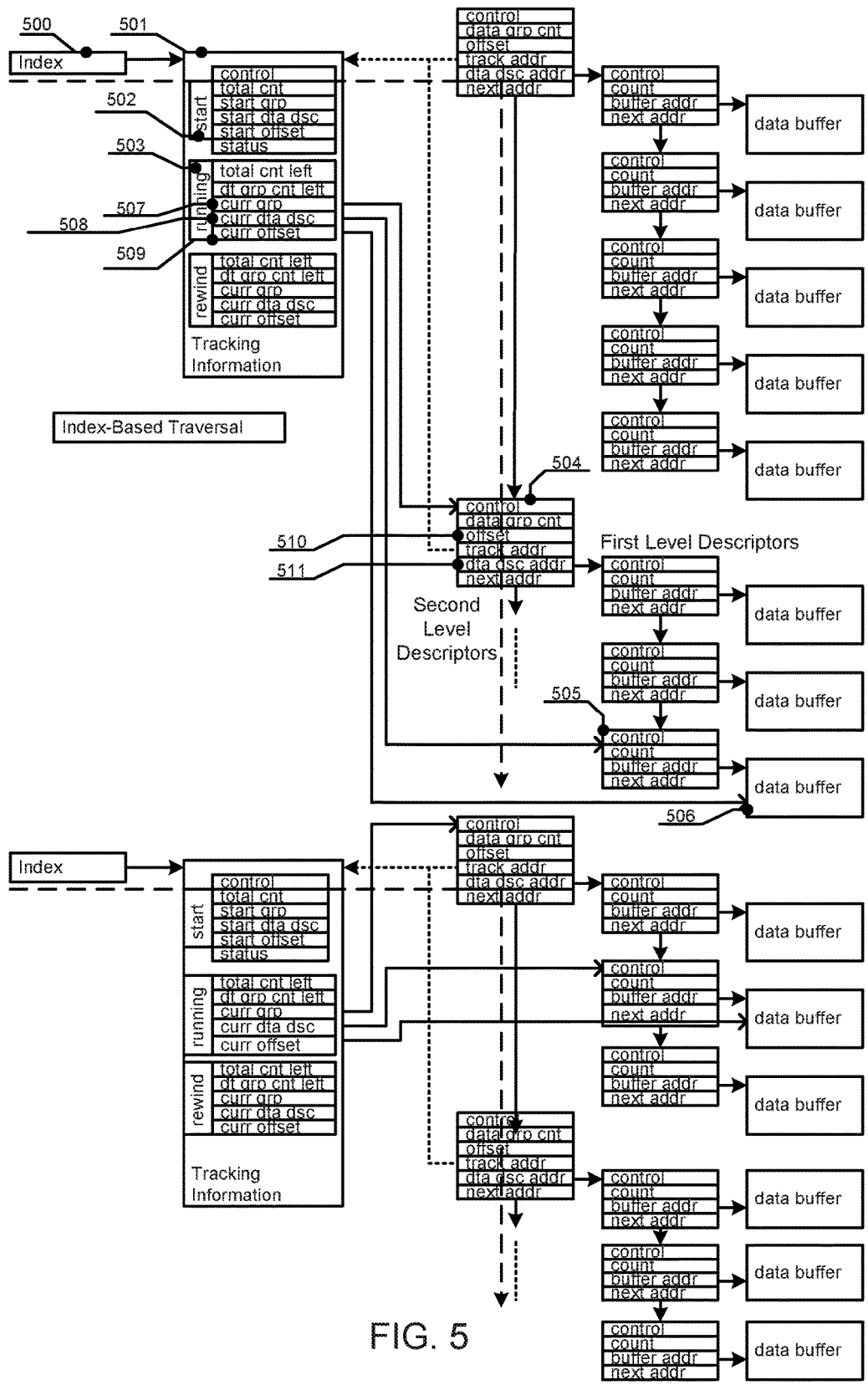
FIG. 5 shows a random (index-based) linked list traversal according to an embodiment of the present invention.

FIG. 5 shows a random (index-based) linked list traversal according to an embodiment of the present invention. FIG. 5 shows traversal of the linked list using the tracking index [500]. The IOC DMA engine initially receives the tracking index [500], and uses this to get the tracking info [501] from memory. The tracking info [501] has the start info [502] and the running info [503]. The running info [503] has the current group pointer [507] (which points to the starting second level descriptor [504]), the current data descriptor pointer [508] (which points to the starting first level descriptor [505]), and the current offset [509] (which points to the word offset [506] in the data buffer). The current data descriptor pointer [508] over-rides the second level descriptor's [504] first level (data) descriptor address [511]. The current offset [509] over-rides the second level descriptor's [504] offset field [510]. Using the running info [503] which is equal to the start info [502] at the time when the descriptor is constructed by firmware, the IOC DMA engine is able to trace the starting second level descriptor [504], first level descriptor [505], and the data buffer word offset [506], where it can begin the DMA. This time can be anywhere after the initial construction of the descriptors by the firmware. During one DMA event, the DMA engine may not be able to consume all of the descriptors, it then records the point where the last transfer was done in the tracking info. Then during another DMA event, the DMA engine can trace back where it left off and start another DMA transfer. After the DMA is done, the IOC DMA engine can receive another tracking index to process. The tracking index allows processing of the descriptor system in random fashion, by being able to jump from one tracking information and the corresponding set of second level descriptor, first level descriptor, and data buffers to another tracking information and the corresponding descriptors and buffers associated with it. This feature is needed by the IOCs for random completion of the data phase of an IOC command.

Figure 6:
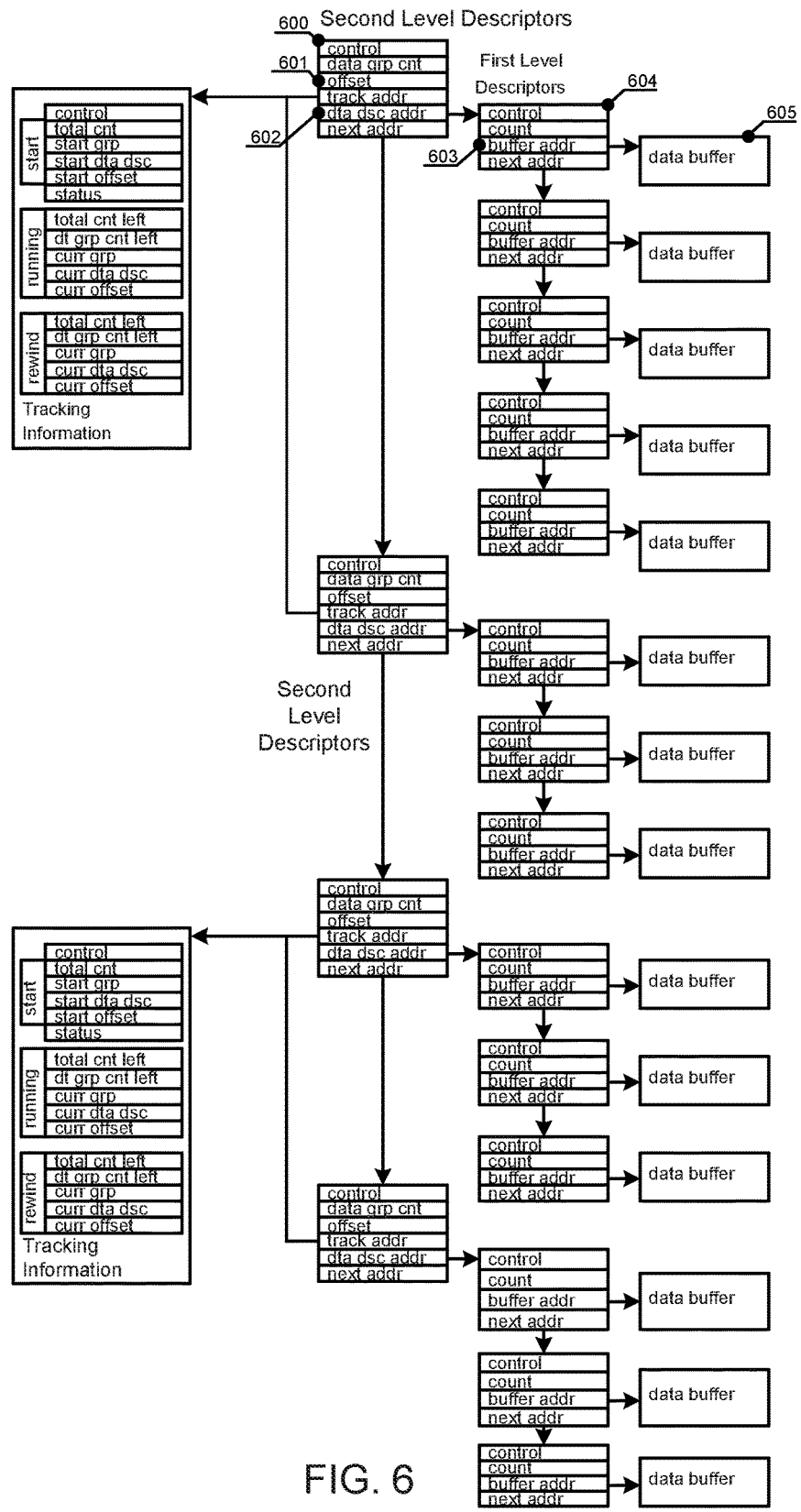
FIG. 6 illustrates a running snapshot of the linked list traversal according to an embodiment of the present invention.

FIGS. 6 to 9 give more details about the sequential linked list traversal according to an embodiment of the present invention. FIG. 6 shows the starting point of the sequential linked list traversal. The IOC DMA engine initially receives the head second level descriptor [600]. The second level descriptor [600] has an initial pointer [602] to the first level descriptor [604], and the word offset [601] which references the data in the data buffer [605]. The first level descriptor [604] has a pointer [603] to the data buffer [605].

Figure 7:
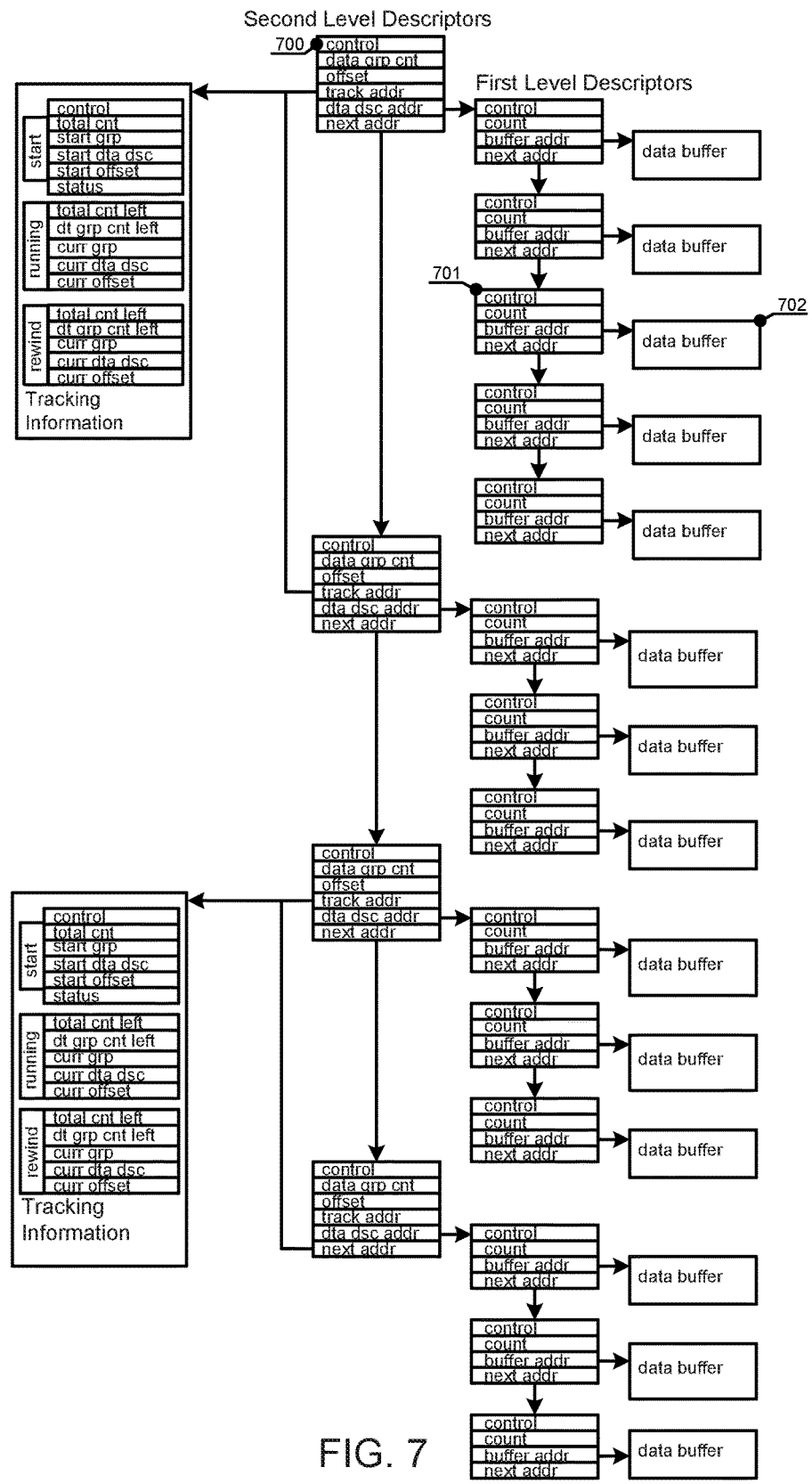
FIG. 7 illustrates a running snapshot of the linked list traversal according to an embodiment of the present invention.

FIG. 7 shows a running snapshot of the linked list traversal. IOC DMA engine still has the head second level descriptor [700], but is now processing the third first level descriptor [701] (of the data group referenced by the second level descriptor [700]). The IOC DMA engine is currently processing a data in the data buffer [702].

Figure 8:
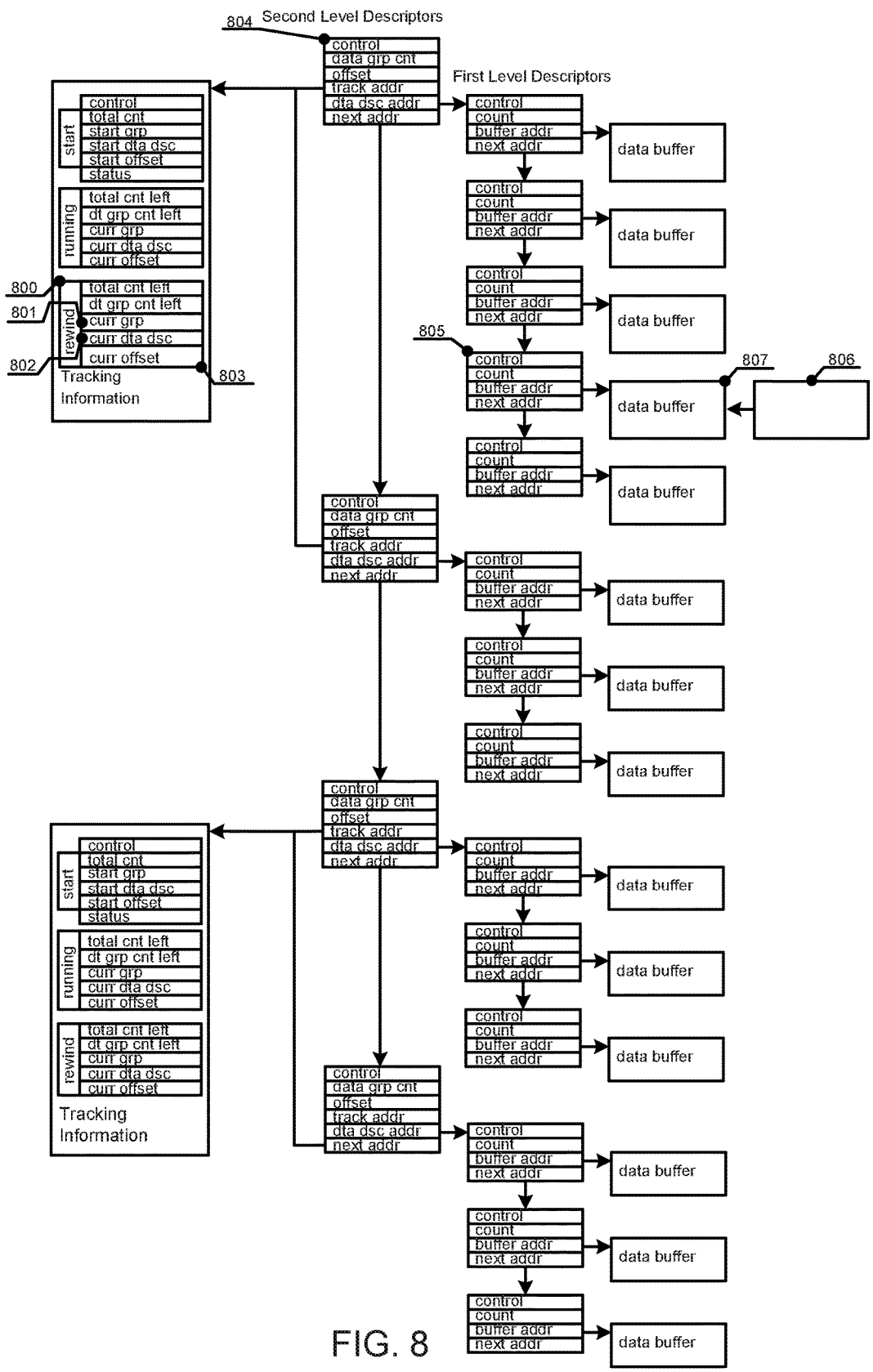
FIG. 8 illustrates a running snapshot of the linked list traversal according to an embodiment of the present invention.

FIG. 8 shows a running snapshot of the linked list traversal. IOC DMA engine still has the head second level descriptor [804], but is now processing the fourth first level descriptor [805] (of the data group referenced by the second level descriptor [804]). The IOC DMA engine is currently at the data offset [806] in the data buffer [807]. At this point after processing by an error checking circuitry, the IOC signals to the IOC DMA engine that this is the point where the last error-free data transfer occurred, and the IOC DMA engine can now update the rewind info [800]. Current Group Pointer [801] now points to the head second level descriptor [804]. Current Data Descriptor Pointer [802] now points to the fourth first level descriptor [805]. Current offset pointer [803] now points to the data offset [806] in the data buffer [807]. The rewind info [800] will be used when the IOC signals to the IOC DMA engine that it needs to return back to the rewind point.

Figure 9:
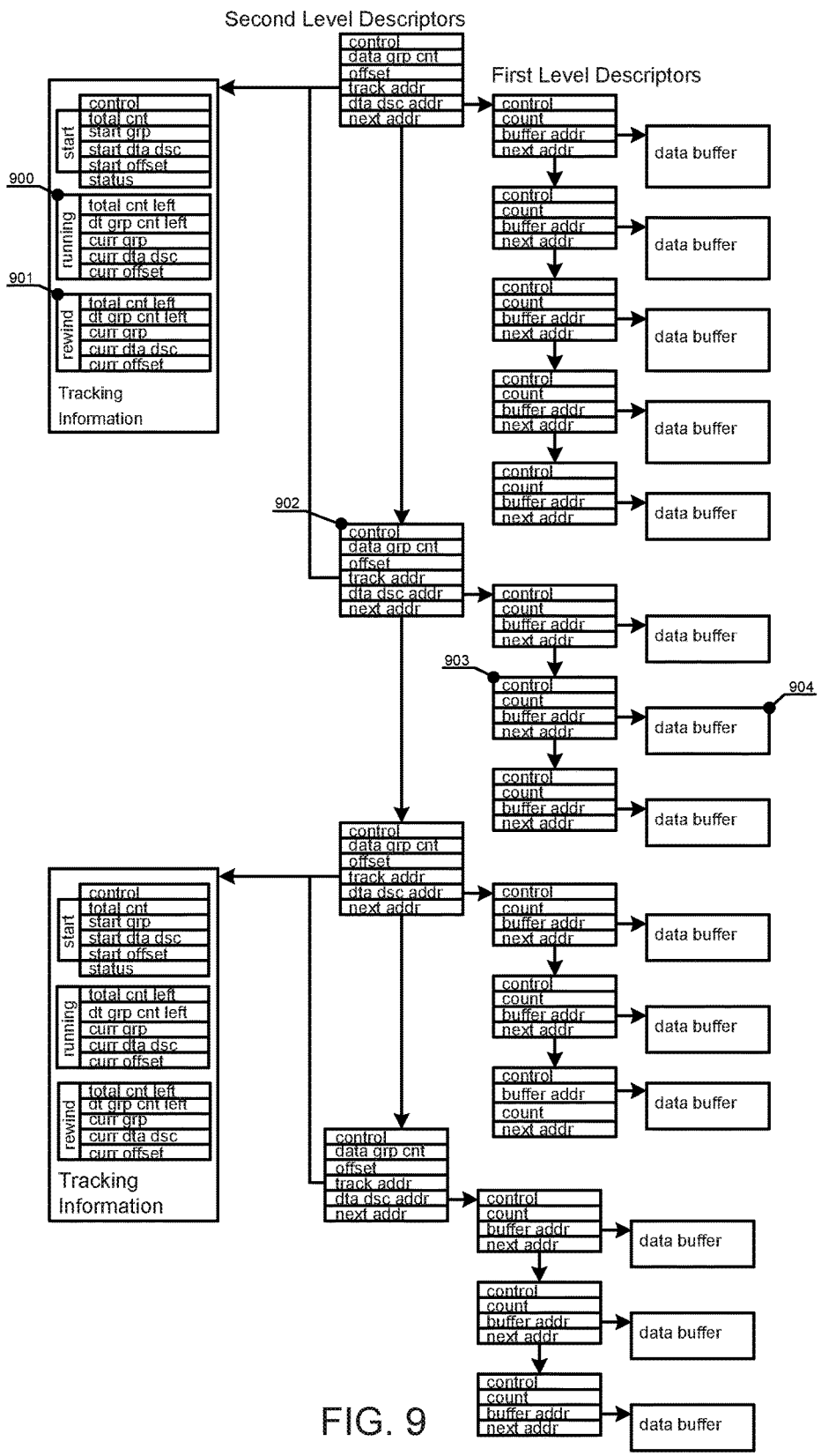
FIG. 9 illustrates more details about a sequential linked list traversal according to an embodiment of the present invention.

FIG. 9 shows a running snapshot of the linked list traversal. IOC DMA engine is now at the next second level descriptor [902], is now processing the second first level descriptor [903] (of the data group referenced by the next second level descriptor [902]). The IOC DMA engine is currently processing a data in the data buffer [904]. In this case, the running info [900] fields is now updated to point to second level descriptor [902], first level descriptor [903], and data in data buffer [904]. In this snapshot point, an error in the data may occur, causing the IOC to signal the IOC DMA engine to go back to the rewind point. If this happens, the IOC DMA engine returns to the state shown by the FIG. 8 snapshot. And the rewind info [901] will be used to adjust the values in the running info [900]. Usually the rewind info [901] data overwrites the running info [900] data.

Figure 10:
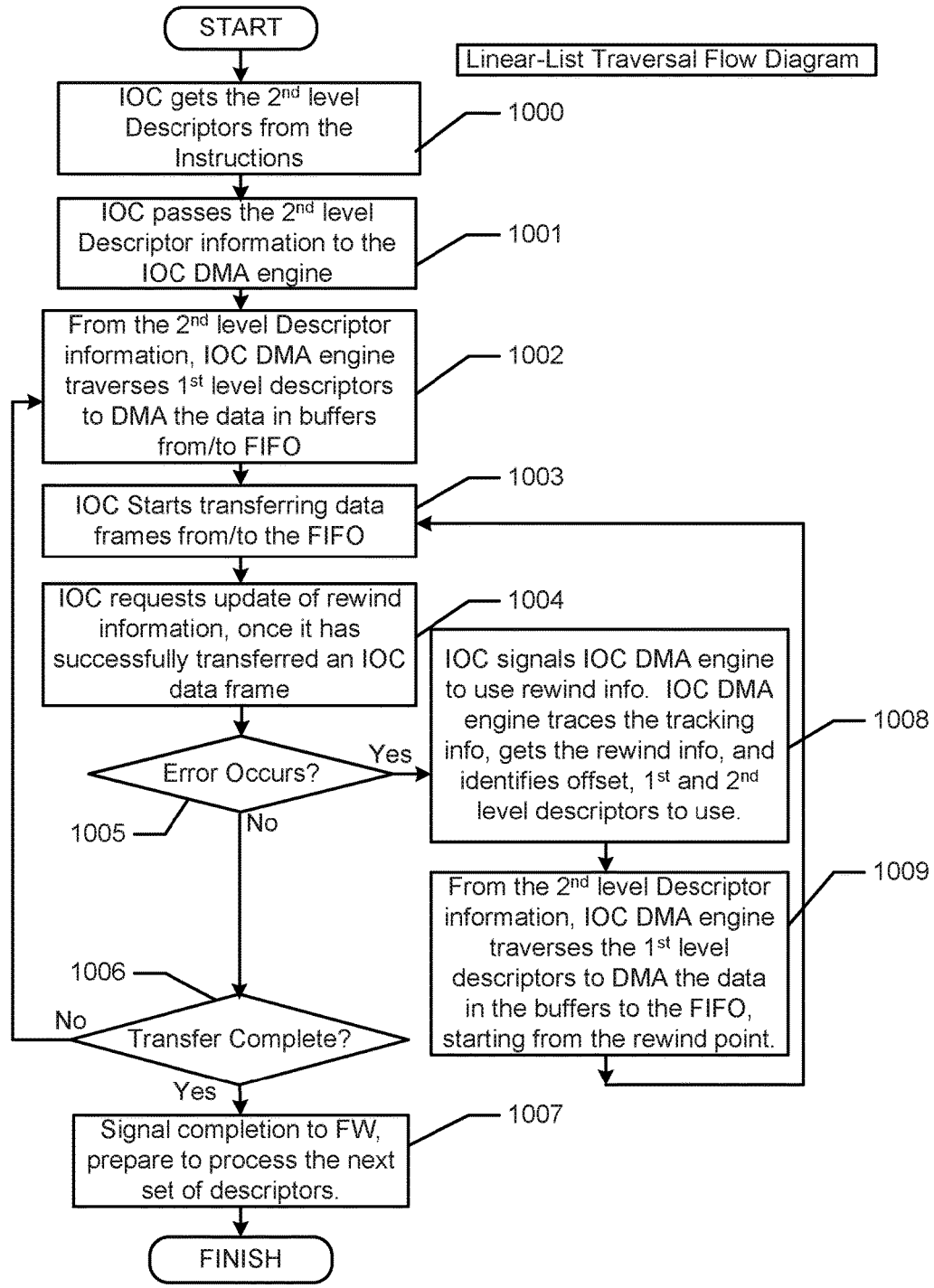
FIG. 10 shows a basic process flow for the sequential linked list traversal according to an embodiment of the present invention.

FIG. 10 shows a basic process flow for the sequential linked list traversal according to an embodiment of the present invention. FIG. 10 shows a basic process flowchart for the sequential linked list traversal which summarizes the process illustrated in FIGS. 6, 7, 8, and 9. In operation [1000], the IOC initially gets the second level descriptors. Then for the next operation [1001], the IOC extracts information from the second level descriptor and passes this information to the IOC DMA engine. In operation [1002], the IOC DMA engine uses the extracted information from the second level descriptors to track down the needed first level descriptors. Once the first level descriptor is fetched, the IOC DMA engine knows where to transfer the data from/to memory, and it begins to transfer the data in operation [1003]. In operation [1004], as the data transfer is going on, the IOC DMA engine also updates the rewind information (in the tracking information) every time after a successful data frame transfer. Running information in the IOC DMA engine is also updated simultaneously as the data is being transferred. Running information in the IOC DMA engine is also updated when a rewind condition occurs. During data transfer, an error may occur as shown in the decision box of operation [1005]. When an error occurs, the IOC DMA goes to the error handling operations [1008, 1009]. In the first error handling operation [1008], when the error condition is signaled to the IOC DMA engine, the rewind information is checked, to get the last point where the data transfer was successful. This point is found by using the rewind information, and the second and first level descriptors, and the offset information at the end of the last successful data transfer fetched. In the second error handling operation [1009], the rewind offset is used to calculate the pointers to the data, or data buffers where the rewind starts. From this starting point, the IOC DMA engine is able to restart the data transfer to retry the last data frame that had an error, and the process returns to operation [1003]. As the data transfer happens in operation [1004] and if there are no errors, the transfer complete condition is checked in the decision box of operation [1006]. When the transfer is not yet complete and more data or buffers are needed the process simply loops back to operation [1002] to linearly traverse the second and first level descriptors to locate the next address for the data or buffer. If the transfer is complete (transfer count condition is satisfied), then the processing moves to operation [1007] where the IOC DMA engine signals the FW of the transfer completion via interrupt and setting the status bits in the status registers or the status fields in the first and second level descriptors. When the IOC or the IOC DMA engine receives a new data transfer request, the system linearly traces the second and first level descriptors again starting from where it last ended, using the last second level descriptor to begin operation [1000].

Figure 11:
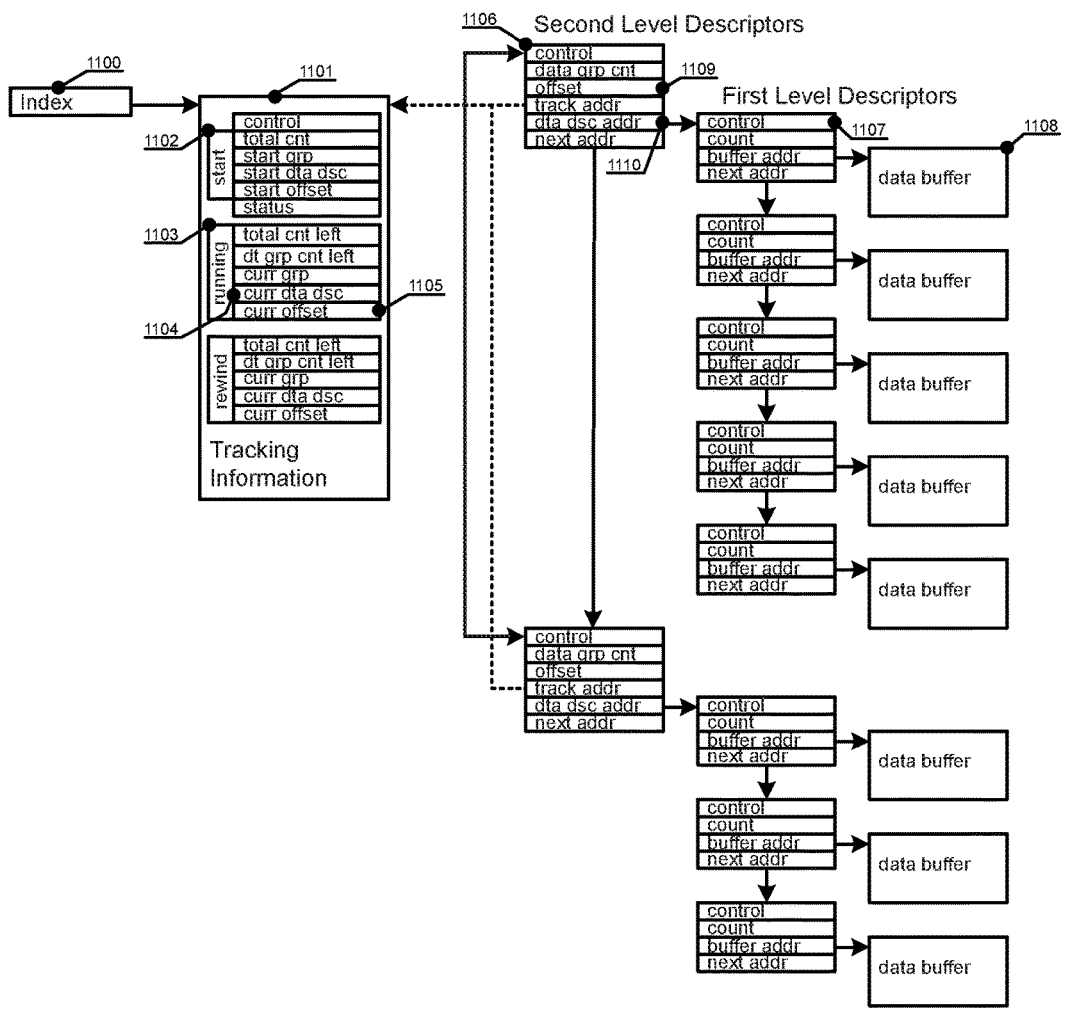
FIG. 11 illustrates more details about a random (index-based) linked list traversal according to an embodiment of the present invention.

FIGS. 11 to 14 give more details about the random (index-based) linked list traversal according to an embodiment of the present invention. FIG. 11 shows the starting point of the random linked list traversal. The IOC DMA engine initially receives the tracking index [1100], and uses this to get the tracking info [1101] from memory. Using the running info [1103] (which is initially equal to the start info [1102]), the IOC DMA engine is able to trace the starting second level descriptor [1106], first level descriptor [1107], and the data buffer word offset [1108], where it can begin the DMA. In this initial scenario:

The current data descriptor pointer [1104] of the tracking info [1101] running info [1103] is equal to the second level descriptor's [1106] data descriptor address [1110].

The current offset [1105] of the tracking info [1101] running info [1103] is equal to the second level descriptor's [1106] offset [1109].

Figure 12:
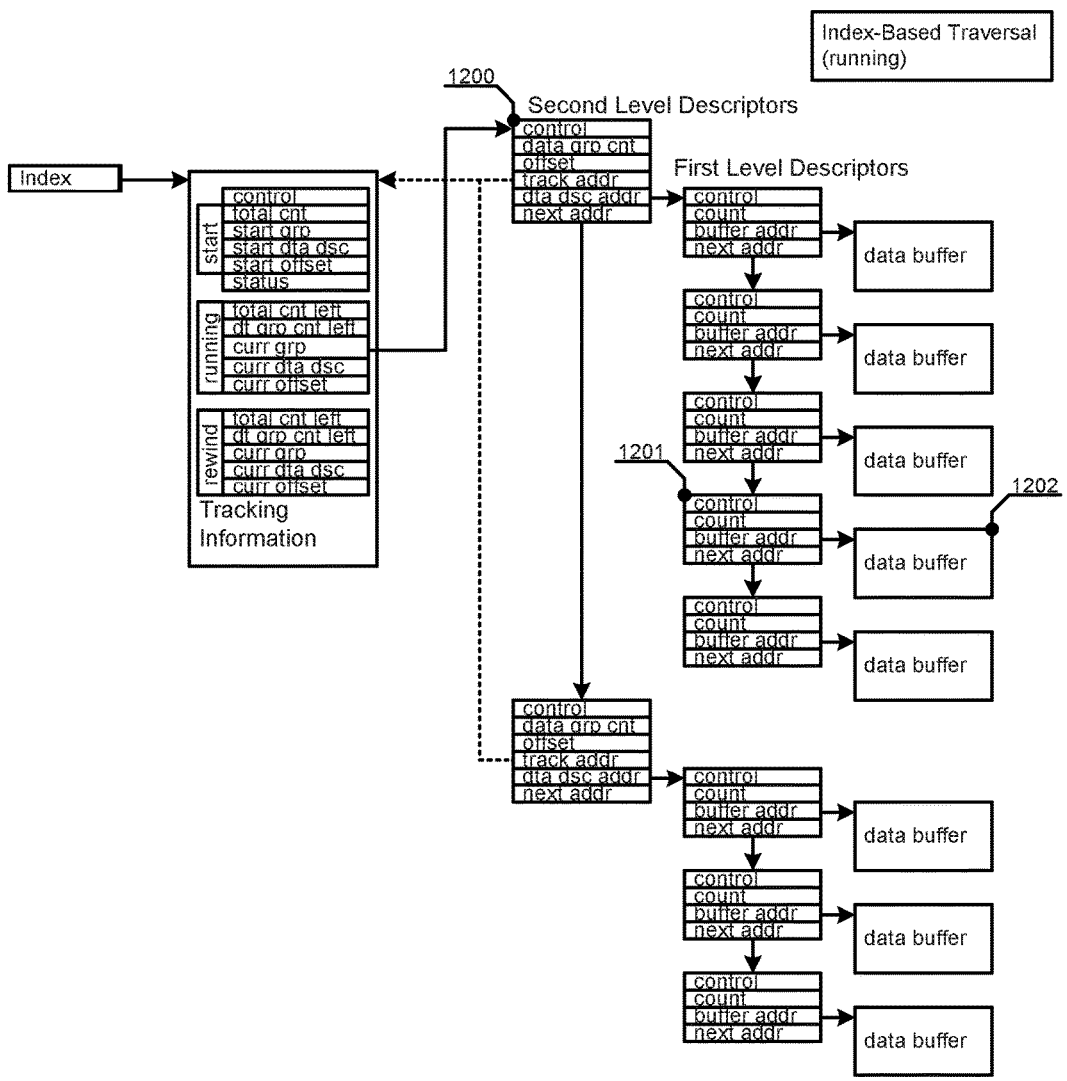
FIG. 12 illustrates more details about a random (index-based) linked list traversal according to an embodiment of the present invention.

FIG. 12 shows a running snapshot of the linked list traversal. IOC DMA engine still has the head second level descriptor [1200], but is now processing the fourth first level descriptor [1201] (of the data group referenced by the second level descriptor [1200]). The IOC DMA engine is currently processing data in the data buffer [1202].

Figure 13:
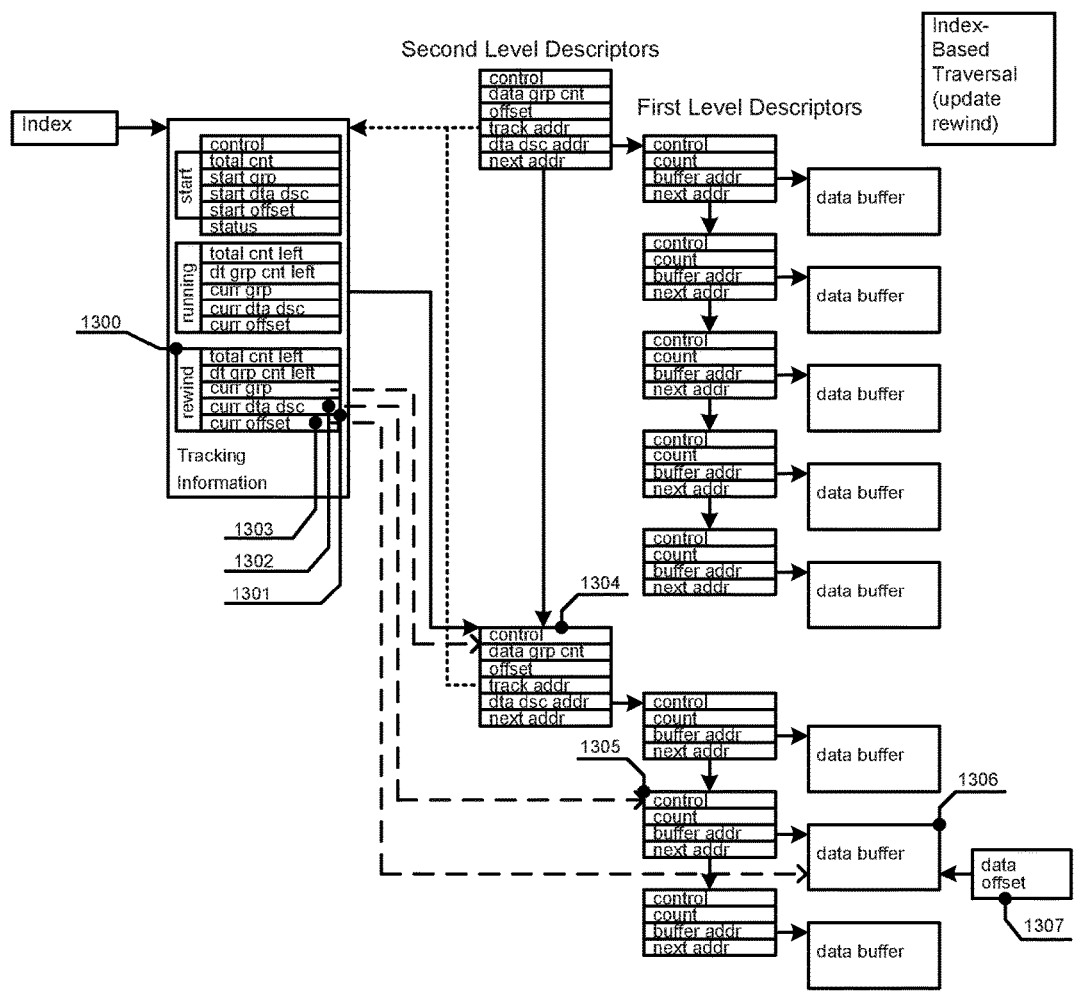
FIG. 13 illustrates more details about a random (index-based) linked list traversal according to an embodiment of the present invention.

FIG. 13 shows a running snapshot of the linked list traversal. IOC DMA engine now has next second level descriptor [1304], is now processing the second first level descriptor [1305] (of the data group referenced by the second level descriptor [1304]). The IOC DMA engine is currently at the data offset [1307] in the data buffer [1306]. At this point, the IOC signals to the IOC DMA engine that this is the point where the last error-free data transfer occurred, and the IOC DMA engine can now update the rewind info [1300]. Current Group Pointer [1301] now points to the next second level descriptor [1304]. Current Data Descriptor Pointer [1302] now points to the second first level descriptor [1305]. Current Offset [1303] now points to the data offset [1307] in the data buffer [1306]. The rewind info [1300] will be used when the IOC signals to the IOC DMA engine that it needs to return back to the rewind point.

Figure 14:
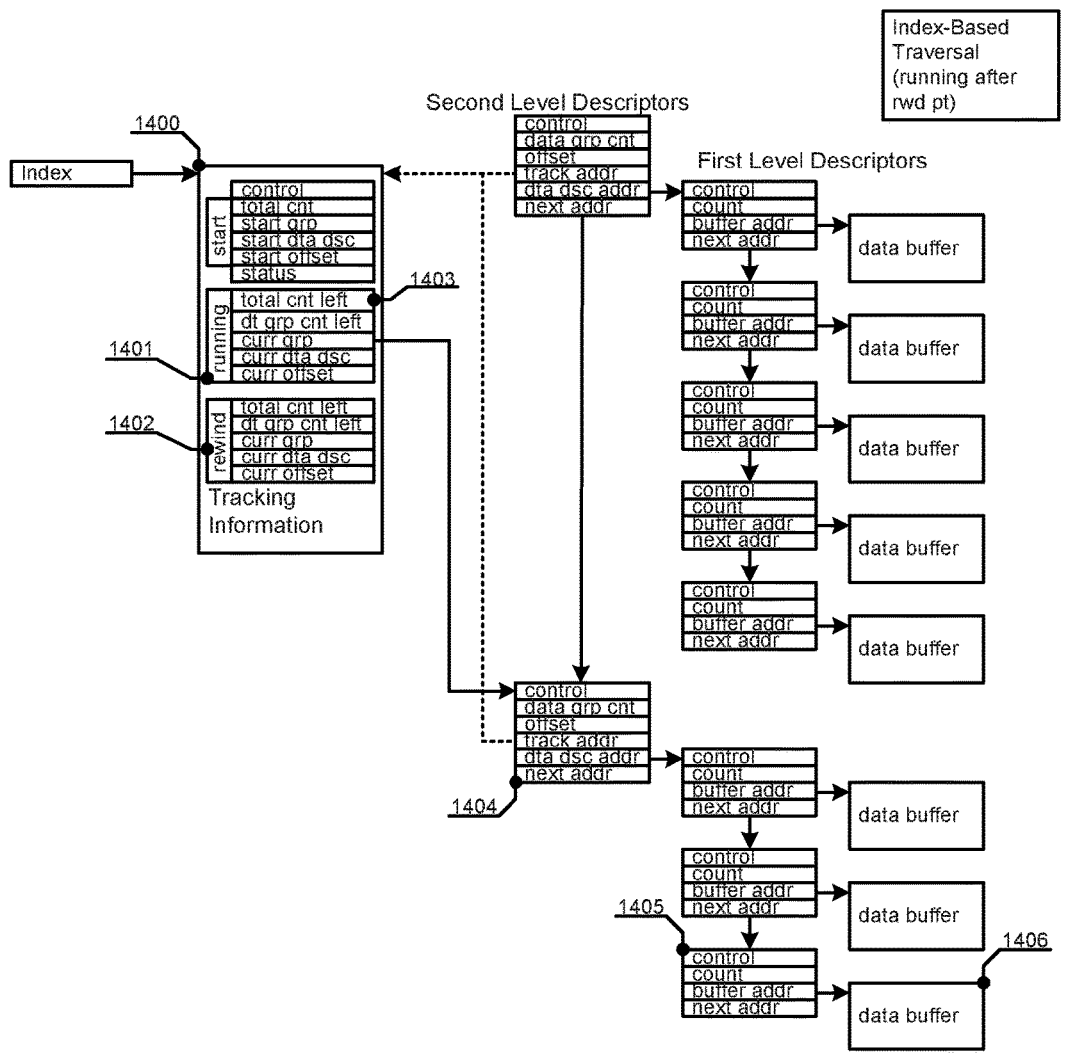
FIG. 14 illustrates more details about a random (index-based) linked list traversal according to an embodiment of the present invention.

FIG. 14 shows a running snapshot of the linked list traversal. The IOC DMA engine is now at the next second level descriptor [1404], is now processing the third first level descriptor [1405] (of the data group referenced by the next second level descriptor [1404]). The IOC DMA engine is currently processing data in the data buffer [1406]. In this snapshot point, an error in the data may occur, causing the IOC to signal the IOC DMA engine to go back to the rewind point. If this happens, the IOC DMA engine returns to the state shown by the FIG. 13 snapshot. And the rewind info [1402] will be used to adjust the values in the running info [1401]. If no error occurs, the IOC DMA engine simply continues until it reaches the end of the last data buffer [1406], or until the total count left [1403] of the tracking info's [1400] running info [1401] reaches zero. The IOC DMA engine stops processing the descriptor system until it receives another tracking info index.

Figure 15:
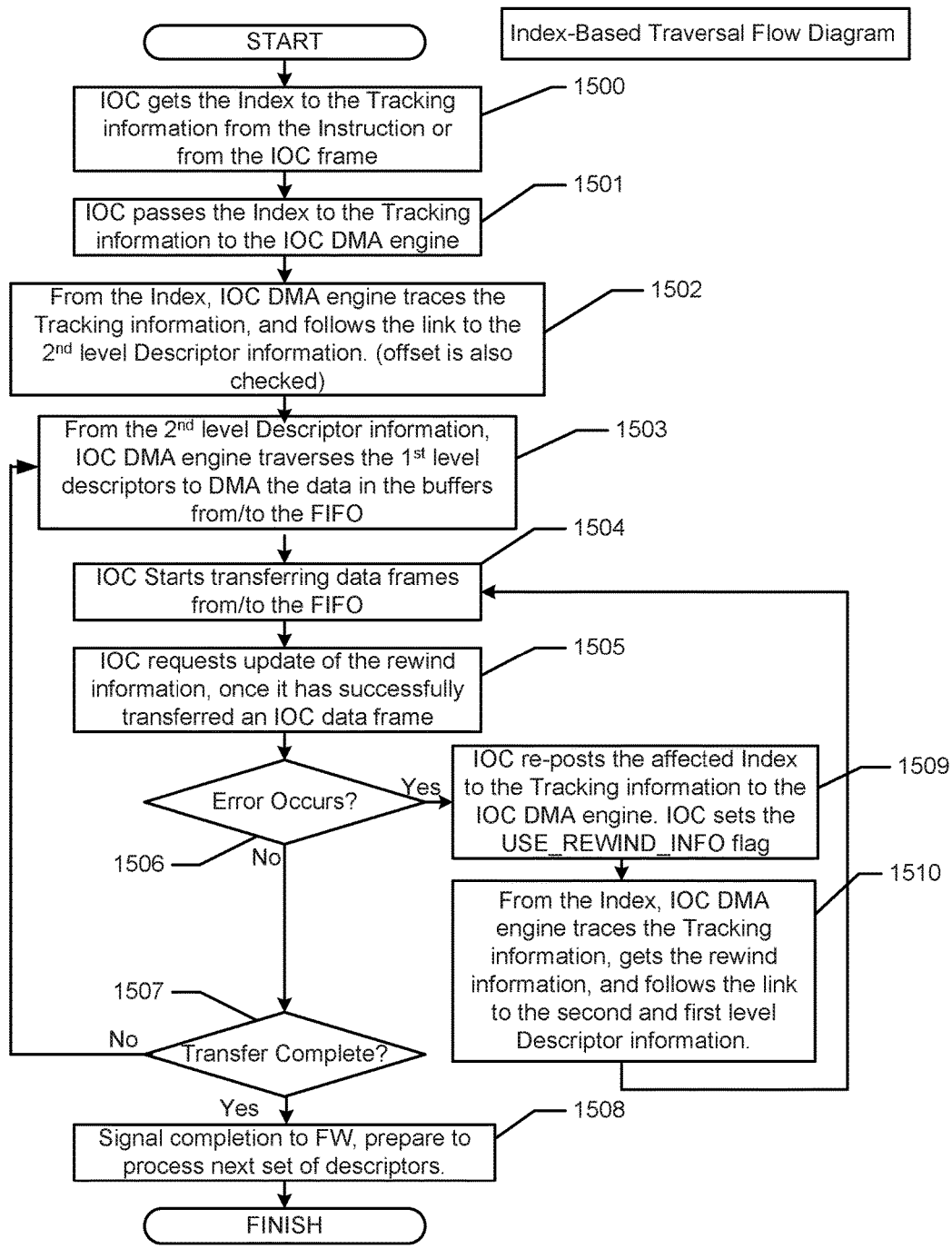
FIG. 15 shows a basic process flow for the sequential linked list traversal according to an embodiment of the present invention.

FIG. 15 shows the basic process flow for the random (index-based) linked list traversal according to an embodiment of the present invention. FIG. 15 shows the basic process flow for the random (index-based) linked list traversal which summarizes the process illustrated in FIGS. 11 to 14. In operation [1500], the IOC initially gets the index or pointer to the tracking information. Then for the next operation [1501], the IOC extracts information from the tracking information and passes this information to the IOC DMA engine. In operation [1502], the IOC DMA engine uses the tracking information to fetch the second level descriptor. Then for the next operation [1503], the IOC DMA engine extracts information from the second level descriptor, and uses the extracted information from the second level descriptors to track down the needed first level descriptors. Once the first level descriptor is fetched, the IOC DMA engine knows where to transfer the data from/to memory, and it begins to transfer the data in operation [1504]. In operation [1505], at the data transfer is going on, the IOC DMA engine also updates the rewind information (in the tracking information) every time there is a successful data frame transfer. Running information copy in the IOC DMA engine is also updated simultaneously as the data is being transferred. Running information copy in the IOC DMA engine is also updated when a rewind condition occurs. Running information copy in the memory is updated once the IOC DMA engine finishes the partial transfer for a given index (or pointer) to the tracking information. During data transfer, an error may occur as shown in the decision box of operation [1506]. When an error occurs, the IOC DMA engine goes to the error handling operations [1509, 1510]. In the first error handling operation [1509], when the error condition is signaled to the IOC DMA engine, the rewind information is checked, to determine the last point where the data transfer was successful. This is determined by using the rewind information, the second and first level descriptor, and the offset information at the end of the last successful data transfer. In the second error handling operation [1510], the rewind offset is used to calculate the pointers to the data, or data buffers where the rewind starts. From this starting point, the IOC DMA is able to restart the data transfer to retry the last data frame that had an error, and the process returns to operation [1504]. As the data transfer happens in operation [1505] and if there are no errors, the transfer complete condition is checked in the decision box of operation [1507]. When the transfer is not yet complete and more data or buffers are needed the process simply loops back to operation [1503] to linearly traverse the second and first level descriptors to locate the next address for the data or buffer. If the transfer is complete (transfer count condition is satisfied), then the processing moves to operation [1508] where the IOC DMA signals the FW of the transfer completion via interrupt and setting the status bits in the status registers or the status fields in the first and second level descriptors. When the IOC or the IOC DMA receives a new data transfer request, a new tracking information index is given. The tracking information index is a way to randomly select and jump to any point in the linked list of second and first level descriptors. Using this new tracking information index, the process is restarted again beginning at operation [1500].

Figure 16:
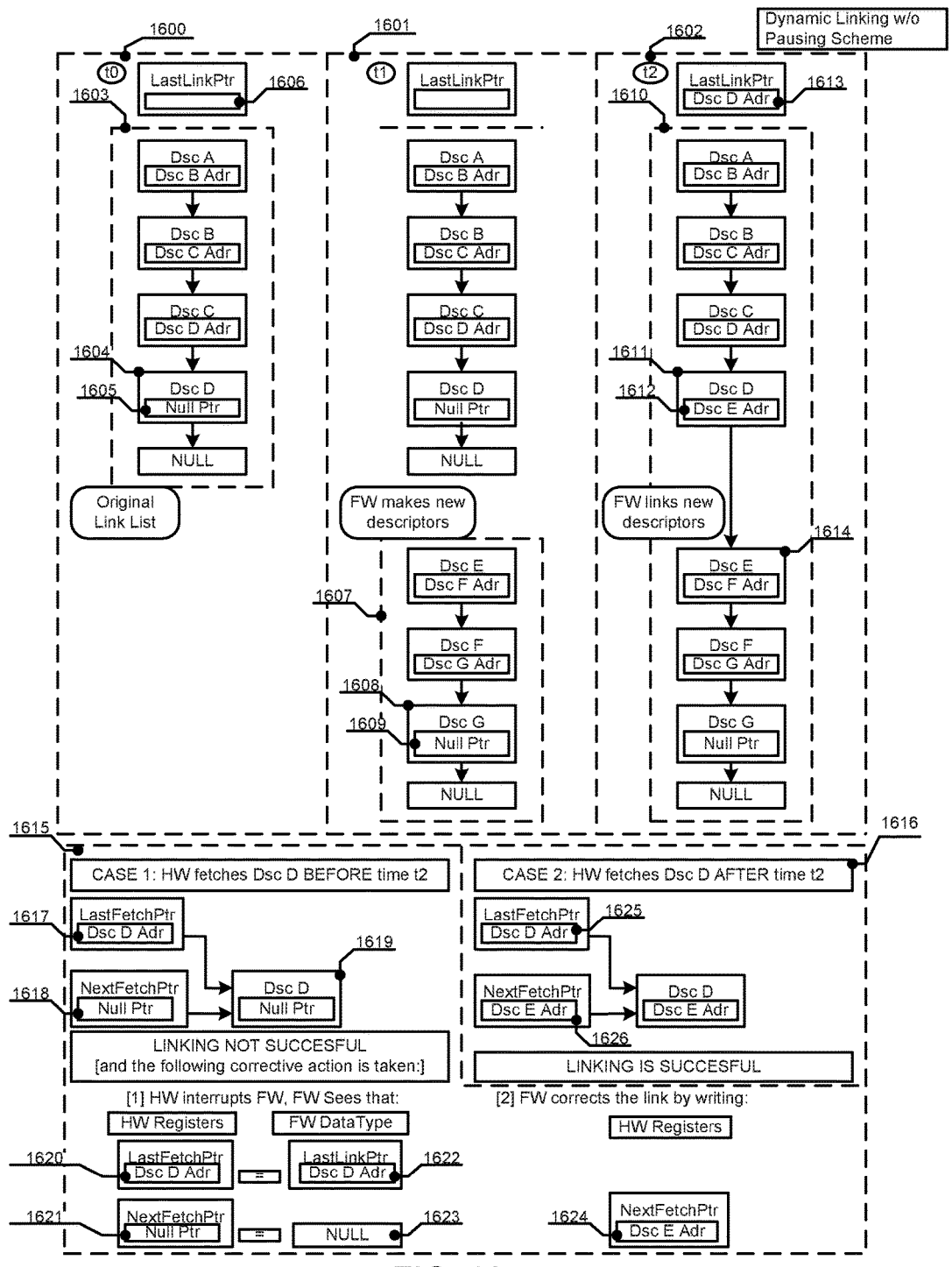
FIG. 16 shows a dynamic linked list addition without firmware pausing the hardware according to an embodiment of the present invention.

FIG. 16 shows the dynamic linked list addition without firmware pausing the hardware according to an embodiment of the present invention. Time t0 [1600] shows the original linked list [1603] that is not yet being appended by the firmware. Note that the next pointer [1605] of descriptor D [1604] is null, since descriptor D [1604] is currently the last descriptor in the list. Since the firmware is not yet attempting to add a descriptor to the linked list, the LastLinkPointer variable [1606] of the firmware has no value yet. Time t1 [1601] shows the new descriptors [1607] being added by the firmware. Descriptor G [1608] is going to be the last descriptor, and its next link pointer [1609] points to null. Time t2 [1602] shows the new extended linked list [1610]. Descriptor D [1611] next pointer [1612] now points to descriptor E [1614]. At this point, the firmware updates its LastLinkPointer [1613] to record the point where firmware last made the link. The blocks at the bottom of FIG. 16 shows the two cases (case 1 [1615] & case 2 [1616]) for the hardware when it fetches descriptor D [1611].

For case 1, the hardware fetched descriptor D [1611] before time t2 [1602]. This means the hardware was not able to catch the updated descriptor D [1611] at time t2 [1602]. When this happens, the hardware register LastFetchPointer [1617] points to the address of descriptor D [1619], (in other words, descriptor D [1619] was the latest descriptor that the hardware read from memory). And the NextFetchPointer [1618] points to null, (in other words, from the hardware's point of view, it has no next descriptor to read from memory). This creates an interrupt condition. Upon receiving this interrupt condition, the firmware reads the hardware register NextFetchPointer [1621], to verify that it is indeed null. Firmware also checks to see that if the firmware variable LastLinkPointer [1622] is equal to the hardware register LastFetchPointer [1620]. This tells the firmware that the hardware was not able to catch the latest addition to the linked list. To remedy this, the firmware writes the address of descriptor E [1614] to the hardware register NextFetchPointer [1624]. This tells the hardware that it has now another descriptor to process. For case 2, the hardware fetched descriptor D [1611] after time t2 [1602], and hardware was able to catch the updated descriptor D [1611]. This can be confirmed by firmware by reading the hardware NextFetchPointer [1626] which correctly points to DescriptorE Address.

Figure 17:
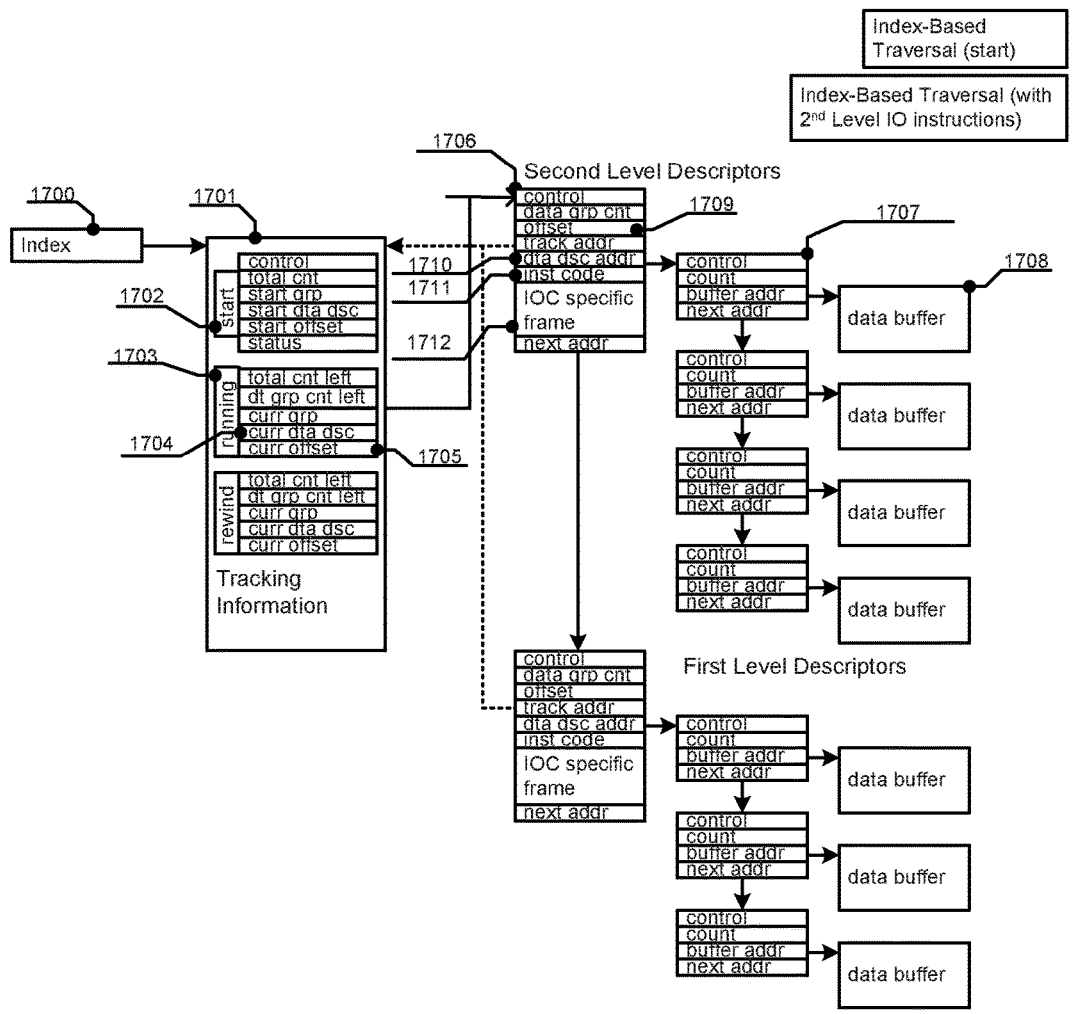
FIG. 17 illustrates more details about an Index-Based Linked List Traversal with second Level IOC Instructions according to an embodiment of the present invention.
Figure 18:
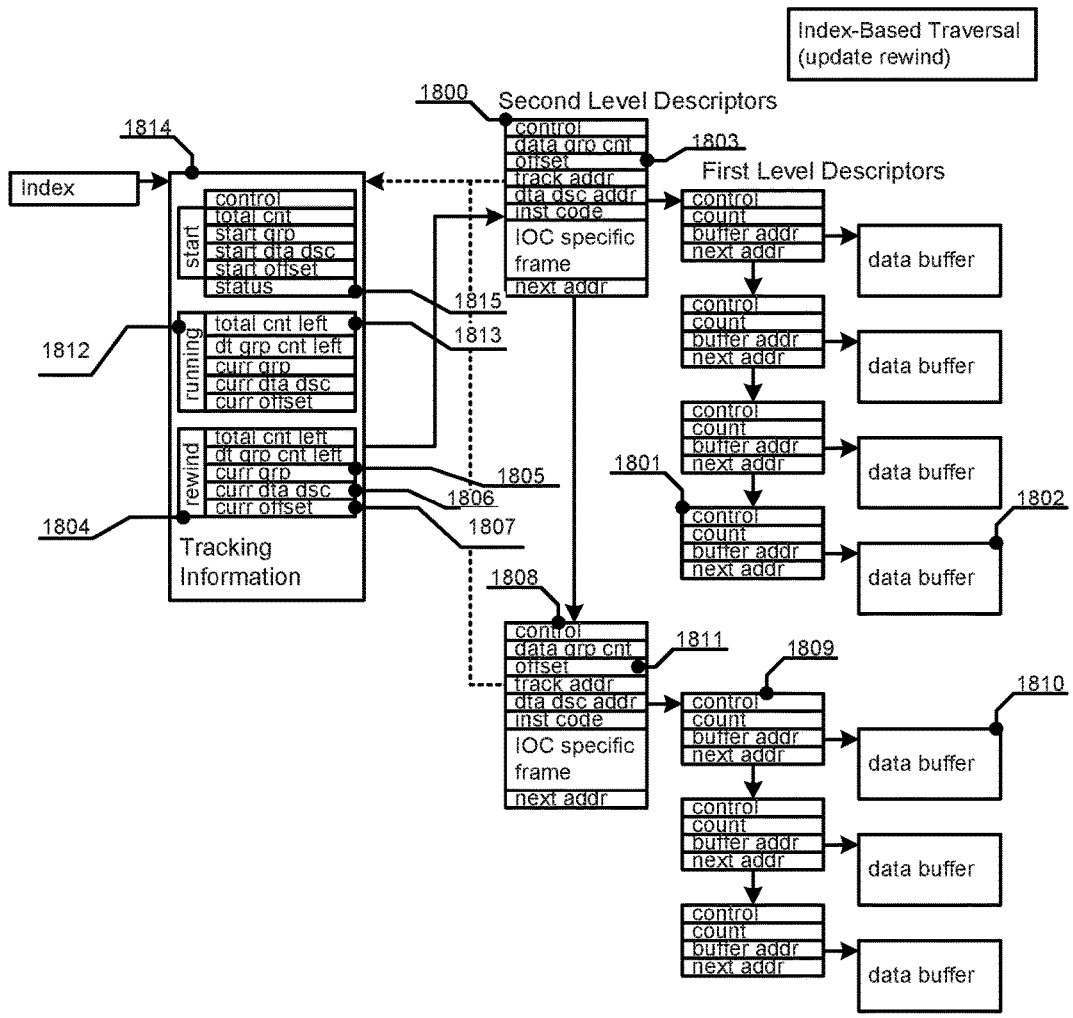
FIG. 18 illustrates more details about an Index-Based Linked List Traversal with second Level IOC Instructions according to an embodiment of the present invention.

FIGS. 17 to 18 give more details about Index-Based Linked List Traversal with second Level IOC Instructions according to an embodiment of the present invention. FIG. 17 shows the starting point of the instruction descriptor traversal. IOC DMA engine receives the tracking index [1700] taken from a lookup table based on the IOC current command tag and uses this to get the tracking information from memory. Using the running info [1703] (which is initially equal to the start info [1702]), the IOC DMA engine is able to trace the starting second level descriptor [1706], IOC Instruction Code [1711], and the IOC specific frame [1712]. From the IOC Instruction Code [1711], IOC may have enough information to process a firmware command (IOC Instruction Code [1711]) and generate the needed IOC specific frames. Or the firmware can do part of the work and create a pre-made IOC specific frame [1712] for the IOC's use in tandem with the IOC Instruction Code [1711] from the firmware, first level descriptor [1707], and the data buffer [1708], where it can begin the DMA. In this initial scenario:

The Instruction Code [1711] and IOC specific frame [1712] are sent to the IOC for execution The tracking info [1701] running info [1703] current data descriptor pointer [1704]=second level descriptor [1706] data descriptor address [1710]

The tracking info [1701] running info [1703] current offset [1705]=second level descriptor [1706] offset [1709]

FIG. 18 shows a running snapshot of the instruction DMA traversal: IOC DMA processing the last first level descriptor [1801] (of the instruction group referenced by the second level descriptor [1800]). The IOC DMA engine is currently processing data in the data buffer [1802]. The data in the data buffer [1802] is the last data to be transferred as referred to by the second level descriptor [1800]. At this point, the IOC may send an error code to the IOC DMA engine to indicate the status of the Instruction and IOC DMA engine writes the status to the Instruction State Info Word in the tracking info.

IOC DMA receives error-free status

IOC DMA engine updates the rewind info [1804]. Current Group Pointer [1805] now points to the next second level descriptor [1808]. Current Data Descriptor Pointer [1806] now points to the first level descriptor [1809]. Current Offset [1807] now points to the data in the data buffer [1810]. IOC DMA engine continues traversing the descriptors until the Running Info [1812] Total Count Left [1813] reaches 0. IOC DMA engine generates an interrupt to Firmware to indicate command completion.

IOC DMA engine receives retry/rewind status

IOC DMA engine loads the rewind info [1804] to the Running Information [1812] to setup the DMA engine to the rewind point.

IOC DMA engine receives error status, e.g. Master/Target Abort

IOC DMA engine loads the Error Code to the tracking info [1814] Status Word [1815] and interrupts the Firmware.

Figure 19:
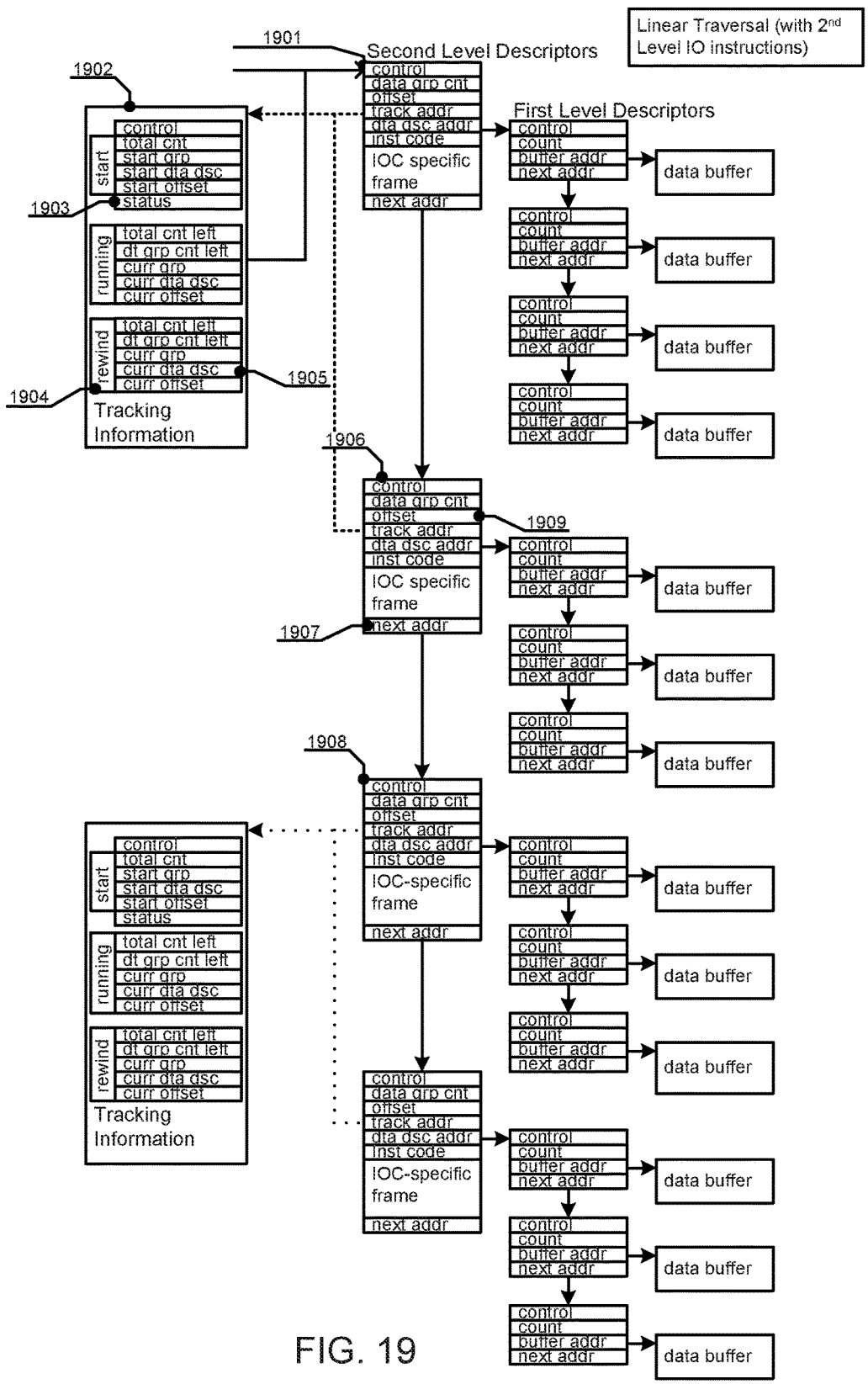
FIG. 19 gives more details about a Linked List Traversal with second Level IOC Instructions according to an embodiment of the present invention.

FIG. 19 gives more details about Linked List Traversal (with second Level IOC Instructions) according to an embodiment of the present invention. FIG. 19 shows the sequential linked list traversal with second level IO Instructions. Initially, the IOC DMA engine receives the head second level descriptor [1901]. The second and first Level linked lists are traversed similar to FIG. 17 and FIG. 18. After the last data [1909] for the second level descriptor [1906] has been transferred error-free, the tracking info [1902] status [1903] and rewind info [1904] have been updated (Current Data Descriptor [1905]=third second Level Descriptor [1908]), the next address [1907] indicates that the IOC DMA engine should traverse to the third second Level Descriptor [1908]. The second and first Level linked lists are traversed similar to FIG. 17 and FIG. 18.

Figure 20:
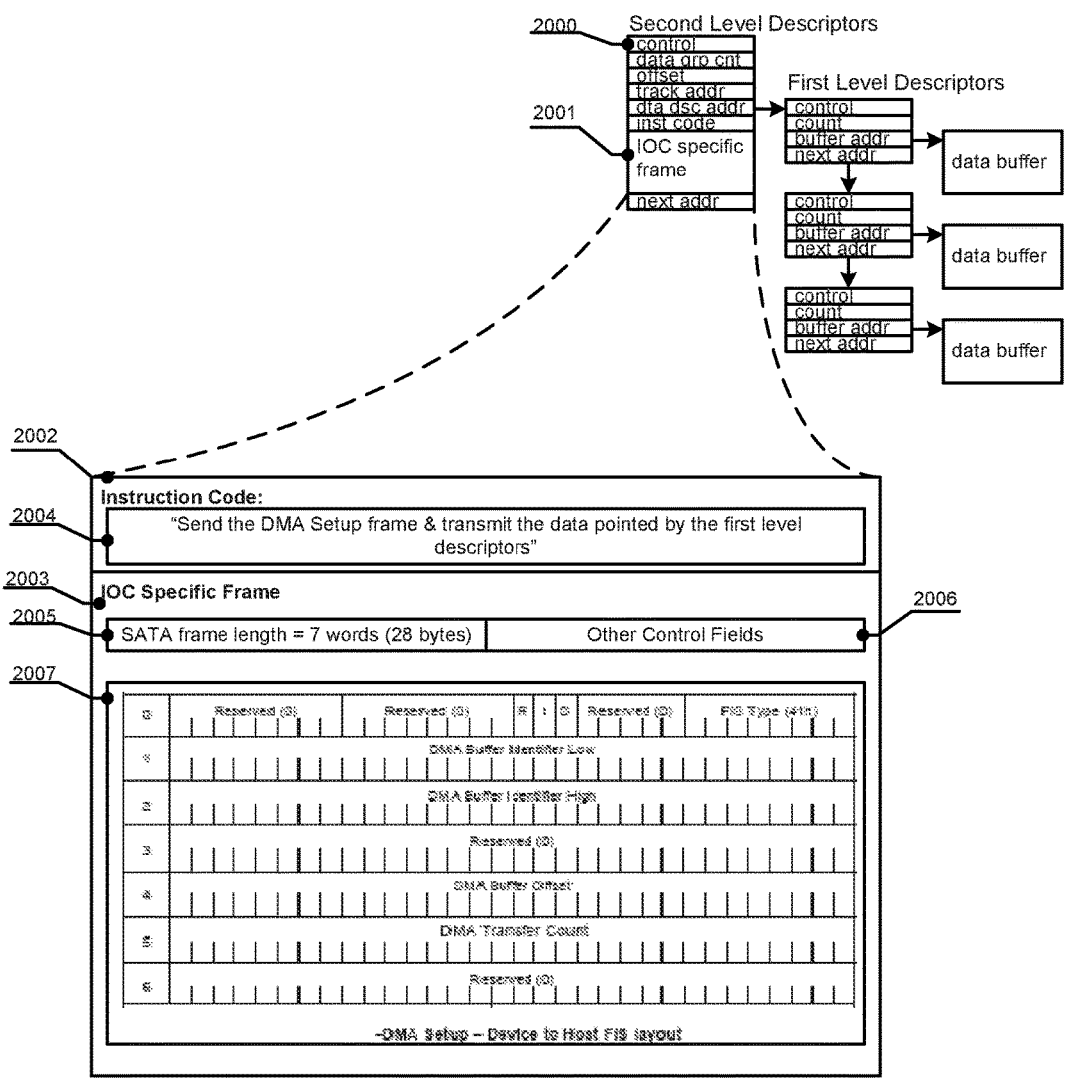
FIG. 20 shows the details of an example of the IOC specific frame inside the second Level IOC Instructions according to an embodiment of the present invention.

FIG. 20 shows the details of an example of the IOC specific frame inside the second Level IOC Instructions according to an embodiment of the present invention. This figure shows the second level descriptor [2000] with an embedded instruction code & IOC specific frame [2001]. An example embedded instruction code & IOC specific frame [2001] with finer details is shown in the enlarged image of the instruction code & IOC specific frame [2002]. This example instruction code & IOC specific frame [2002] is generated by the firmware, and used by a SATA (Serial-ATA) IO-Protocol Controller, while the rest of the second level descriptor [2000] is used by the partner IO DMA engine for the data portion of the instruction. This example instruction code & IOC specific frame [2002] has a sample instruction code [2004] which tells the IO-Protocol Controller to process the adjacent IOC Specific Frame [2003] and transmit (via DMA) the corresponding data referenced by the descriptor set grouped by the second level descriptor [2000]. The sample IOC Specific Frame [2003] can contain the frame length [2005], other control fields [2006], and an IO-standards-protocol-defined frame or packet [2007] which the IO-Protocol controller can transmit directly to the external IC bus. For this example, the IO-standards-protocol-defined frame or packet [2007] is a SATA DMA Setup—Device to Host FIS (SATA Frame Information Structure), which is a frame sent by the SATA device to a SATA host to signal a start of a DMA transfer.

Figure 21:
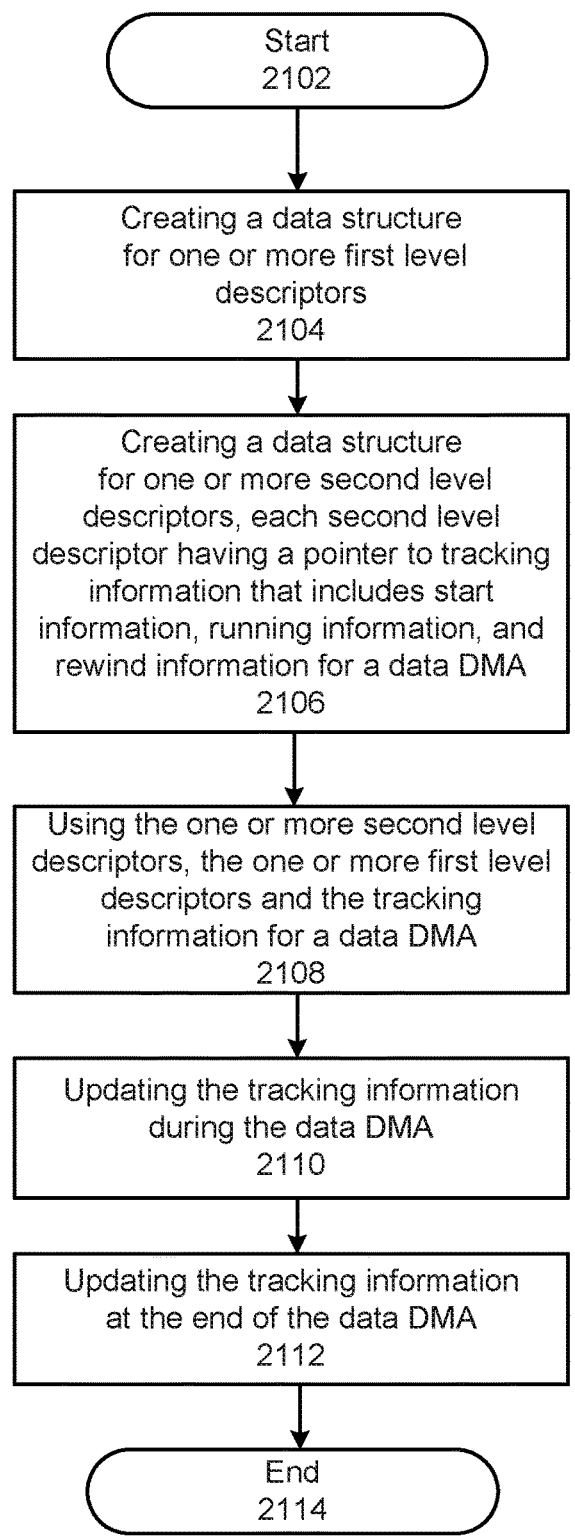
FIG. 21 illustrates a flowchart for a method to use a linked list descriptor mechanism to pass information among flash, memory, and IO controller modules according to an embodiment of the present invention.

FIG. 21 illustrates a flowchart for a method to use a two level linked list descriptor mechanism to pass information among flash, memory, and IC controller modules. Linked list descriptors employ indexing and linked lists, with a link pointing to a link. Using such descriptors, elements may be added, read, or retried easily in hardware. Each descriptor indicates the address to the next descriptor. By generating interrupts and/or monitoring the changes in the head and tail of the descriptor list, modules pass messages to the CPU FW and vice versa. The method begins in operation 2102. Operation 2104 is next and includes creating a first level data structure for one or more first level descriptors. Operation 2106 is next and includes creating a second level data structure for one or more second level descriptors, each second level descriptor having a pointer to tracking information that includes start information, running information, and rewind information for a data DMA. Operation 2108 is next and includes using the one or more second level descriptors, the one or more first level descriptors, and the tracking information for a data DMA. Operation 2110 is next and includes updating the tracking information during the data DMA. Operation 2112 is next and includes updating the tracking information at the end of the data DMA. The method ends in operation 2114.

In one embodiment, the second level descriptors allow the first level descriptors to be shared between two DMA engines that have different native data sizes. The offset information in the second level descriptors allows adjustment of the data for the other DMA engine. In one embodiment, each second level descriptor has a pointer to the tracking information, which has three main components: the start info, the running info, and the rewind info.

In one embodiment, the start info is controlled by firmware and is a static value. Hardware uses this as a reference to where the data DMA (controlled by the tracking information) starts.

In one embodiment, the running info is controlled by the hardware. It is initially equal to the start info. As the DMA progresses, this info is updated by the hardware. This allows the hardware to track the data that it has already transferred, so it knows where to continue the DMA, if the tracking info in accessed again.

In one embodiment, each second level descriptor has a pointer to the tracking information which can be used to search for the rewind info. In one embodiment, the rewind info is controlled by the hardware. It is initially equal to the start info. This is updated by the hardware after the partial data transfer was transferred error free, so the hardware knows where the last error-free data transfer was completed, so it can return back to this point (rewind) if an error occurred in the data that followed.

In one embodiment, locating the tracking information includes using a tracking index. This allows a DMA engine to traverse the descriptor system by either sequentially following the next address entry of the second level descriptors, or by jumping to the desired tracking information by using the tracking index. Traversal using the tracking index is particularly useful for an IOC DMA engine if the data for one IOC command is located in a linked list structure controlled by tracking information. The tracking index is the index in a tracking info address table in memory that contains the address to the desired tracking information. By using the tracking index, the IOC DMA engine can look up the tracking info address table to get the corresponding address of the tracking info.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus comprising a processor, a logic and a memory, wherein the processor, logic and memory are operable to configure a data structure comprising:
    one or more second level descriptor; and
    one or more first level linked list corresponding to the one or more second level descriptor;
        wherein each second level descriptor comprises a data descriptor address for pointing to a corresponding first level linked list;
        wherein each first level linked list comprises one or more first level descriptor;
        wherein each first level descriptor comprises a buffer address for pointing to a data buffer; and
        wherein at least one first level linked list and the one or more first level descriptor corresponding to the first level linked list is accessed by a first Direct Memory Access (DMA) channel and a second DMA channel for coordinated data transfer of the data buffer corresponding to the one or more first level descriptor.

2. The apparatus of claim 1, wherein each second level descriptor further comprises a next address for forming a linked list of the one or more second level descriptor.

3. The apparatus of claim 1, wherein each second level descriptor further comprises an offset and a data group count for determining a beginning DMA location and an ending DMA location for the second DMA channel.

4. The apparatus of claim 1, wherein each second level descriptor further comprises a track address for pointing to a tracking information table, the tracking information table comprising a start information table operable for storing one or more initial condition information, a running information table operable for storing one or more completed DMA transfer information and a rewind information table operable for storing one or more completed error-free DMA transfer information wherein a return point for one or more hardware retries is established.

5. The apparatus of claim 4, wherein the running information table and the rewind information table are updated by hardware in real time.

6. The apparatus of claim 4, further comprises one or more tracking index for accessing the one or more tracking information table wherein the one or more second level descriptor can be accessed in a non-sequential fashion.

7. The apparatus of claim 1, further comprises one or more firmware pointer and one or more hardware register whereby one or more second level descriptor can be added in real time without pausing the coordinated data transfer of the first DMA channel and the second DMA channel.

8. The apparatus of claim 1, wherein a given second level descriptor among the one or more second level descriptor further comprises an optional instruction code and an IOC-specific (Input Output Controller-specific) frame, wherein the second level descriptor comprises firmware instructions for an IO-Protocol (Input Output-Protocol) Controller, and wherein a data portion for the instructions is defined in the given second level descriptor to be processed by an IOC DMA engine.

9. A method comprising:
    configuring a data structure in an apparatus comprising a processor, a logic and a memory, wherein the data structure comprises:
    one or more second level descriptor; and one or more first level linked list corresponding to the one or more second level descriptor;

wherein each second level descriptor comprises a data descriptor address for pointing to a corresponding first level linked list;

wherein each first level linked list comprises one or more first level descriptor;

wherein each first level descriptor comprises a buffer address for pointing to a data buffer; and accessing at least one first level linked list and the one or more first level descriptor corresponding to the first level linked list by a first Direct Memory Access (DMA) channel and a second DMA channel for coordinated data transfer of the data buffer corresponding to the one or more first level descriptor.

10. The method of claim 9, wherein each second level descriptor further comprises a next address for forming a linked list of the one or more second level descriptor.

11. The method of claim 9, wherein each second level descriptor further comprises an offset and a data group count for determining a beginning DMA location and an ending DMA location for the second DMA channel.

12. The method of claim 9, wherein each second level descriptor further comprises a track address for pointing to a tracking information table, the tracking information table comprising a start information table operable for storing one or more initial condition information, a running information table operable for storing one or more completed DMA transfer information and a rewind information table operable for storing one or more completed error-free DMA transfer information wherein a return point for one or more hardware retries is established.

13. The method of claim 12, wherein the running information table and the rewind information table are updated by hardware in real time.

14. The method of claim 12, further comprises one or more tracking index for accessing the one or more tracking information table wherein the one or more second level descriptor can be accessed in a non-sequential fashion.

15. The method of claim 9, further comprises one or more firmware pointer and one or more hardware register whereby one or more second level descriptor can be added in real time without pausing the coordinated data transfer of the first DMA channel and the second DMA channel.

16. The method of claim 9, wherein a given second level descriptor among the one or more second level descriptor further comprises an optional instruction code and an IOC-specific (Input Output Controller-specific) frame, wherein the second level descriptor comprises firmware instructions for an IO-Protocol (Input Output-Protocol) Controller, and wherein a data portion for the instructions is defined in the given second level descriptor to be processed by an IOC DMA engine.

17. An article of manufacture, comprising:
a non-transitory computer-readable medium having stored thereon instructions operable to permit an apparatus to perform a method comprising:
configuring a data structure in the apparatus comprising a processor, a logic and a memory, wherein the data structure comprises:
one or more second level descriptor; and
one or more first level linked list corresponding to the one or more second level descriptor;
wherein each second level descriptor comprises a data descriptor address for pointing to a corresponding first level linked list;
wherein each first level linked list comprises one or more first level descriptor;
wherein each first level descriptor comprises a buffer address for pointing to a data buffer; and
accessing at least one first level linked list and the one or more first level descriptor corresponding to the first level linked list by a first Direct Memory Access (DMA) channel and a second DMA channel for coordinated data transfer of the data buffer corresponding to the one or more first level descriptor.

18. The article of manufacture of claim 17, wherein each second level descriptor further comprises a next address for forming a linked list of the one or more second level descriptor.

19. The article of manufacture of claim 17, wherein each second level descriptor further comprises an offset and a data group count for determining a beginning DMA location and an ending DMA location for the second DMA channel.

20. The article of manufacture of claim 17, wherein each second level descriptor further comprises a track address for pointing to a tracking information table, the tracking information table comprising a start information table operable for storing one or more initial condition information, a running information table operable for storing one or more completed DMA transfer information and a rewind information table operable for storing one or more completed error-free DMA transfer information wherein a return point for one or more hardware retries is established.

* * * * *